(12) United States Patent
Yu et al.

(10) Patent No.: US 11,978,242 B2
(45) Date of Patent: May 7, 2024

(54) SYSTEMS AND METHODS FOR IMPROVED FACIAL ATTRIBUTE CLASSIFICATION AND USE THEREOF

(71) Applicant: L'Oreal, Paris (FR)

(72) Inventors: Zhi Yu, Toronto (CA); Yuze Zhang, Scarborough (CA); Ruowei Jiang, Mississauga (CA); Jeffrey Houghton, East York (CA); Parham Aarabi, Richmond Hill (CA); Frederic Antoinin Raymond Serge Flament, Clichy (FR)

(73) Assignee: L'Oreal, Paris (FR)

( * ) Notice: Subject to any disclaimer, the term of this patent is extended or adjusted under 35 U.S.C. 154(b) by 137 days.

(21) Appl. No.: 17/361,743

(22) Filed: Jun. 29, 2021

(65) Prior Publication Data

US 2021/0406996 A1     Dec. 30, 2021

Related U.S. Application Data

(60) Provisional application No. 63/045,303, filed on Jun. 29, 2020.

(30) Foreign Application Priority Data

Oct. 5, 2020   (FR) ........................................ 2010128

(51) Int. Cl.
*G06K 9/46* (2006.01)
*G06K 9/62* (2022.01)
(Continued)

(52) U.S. Cl.
CPC ............. *G06V 10/764* (2022.01); *G06N 3/04* (2013.01); *G06Q 30/0631* (2013.01);
(Continued)

(58) Field of Classification Search
CPC ...... G06V 40/16–40/179; G06V 10/70; G06V 10/778–10/7796; G06V 10/82; G06V 10/454; G06N 3/0464; G06N 3/045; G06N 20/00–20/20; G06T 2207/20081; G06Q 30/0631
See application file for complete search history.

(56) References Cited

U.S. PATENT DOCUMENTS 9,349,178 B1   5/2016 Itu et al.
11,106,896 B2 * 8/2021 Hu ......................... G06V 10/82
(Continued)

FOREIGN PATENT DOCUMENTS

WO    WO 2019/183758 A1    10/2019

OTHER PUBLICATIONS

Written Opinion and Search Report dated May 21, 2021 in French Application No. 2010128.

*Primary Examiner* — Brian Werner
(74) *Attorney, Agent, or Firm* — Oblon, McClelland, Maier & Neustadt, L.L.P.

(57) ABSTRACT

There is described a deep learning supervised regression based model including methods and systems for facial attribute prediction and use thereof. An example of use is an augmented and/or virtual reality interface to provide a modified image responsive to facial attribute predictions determined from the image. Facial effects matching facial attributes are selected to be applied in the interface.

16 Claims, 15 Drawing Sheets

(51) Int. Cl.
*G06N 3/04* (2023.01)
*G06Q 30/0601* (2023.01)
*G06V 10/764* (2022.01)
*G06V 10/82* (2022.01)
*G06V 40/16* (2022.01)

(52) U.S. Cl.
CPC ......... *G06Q 30/0643* (2013.01); *G06V 10/82* (2022.01); *G06V 40/162* (2022.01); *G06V 40/168* (2022.01); *G06V 40/171* (2022.01); *G06V 40/172* (2022.01)

(56) References Cited

U.S. PATENT DOCUMENTS

| | | | |
|---|---|---|---|
| 2012/0177288 A1* | 7/2012 | Chaussat | G06T 11/001 382/218 |
| 2014/0119642 A1* | 5/2014 | Lee | G06V 40/171 382/159 |

* cited by examiner

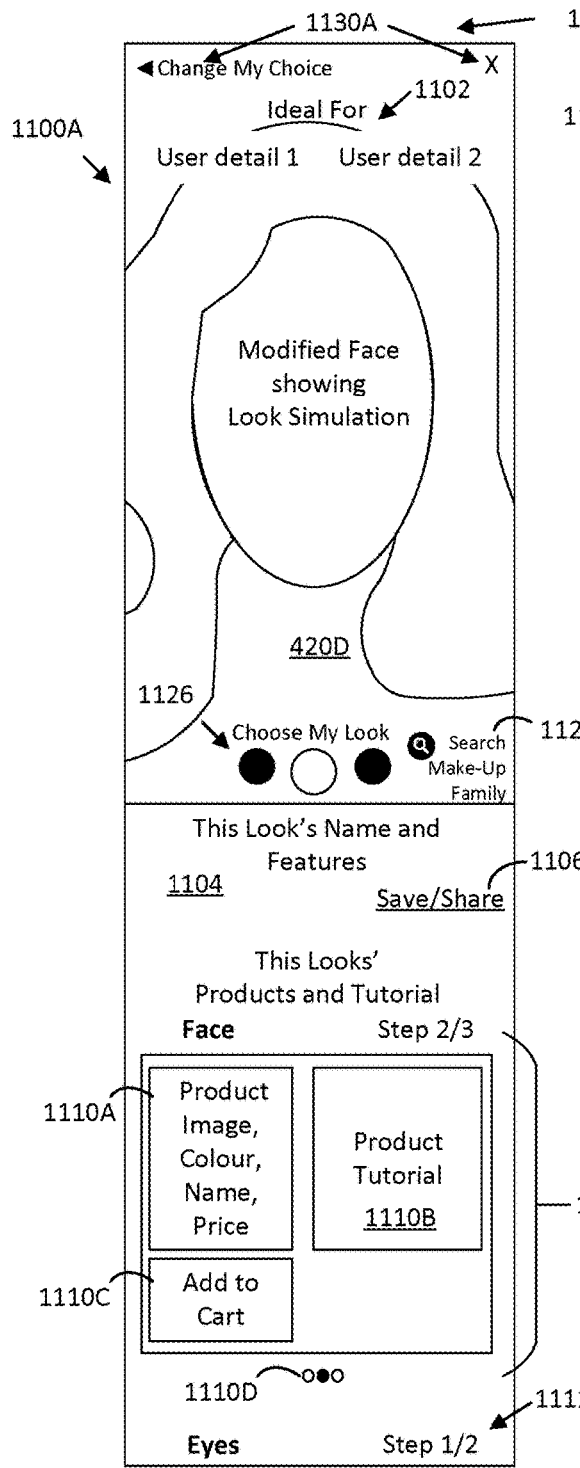
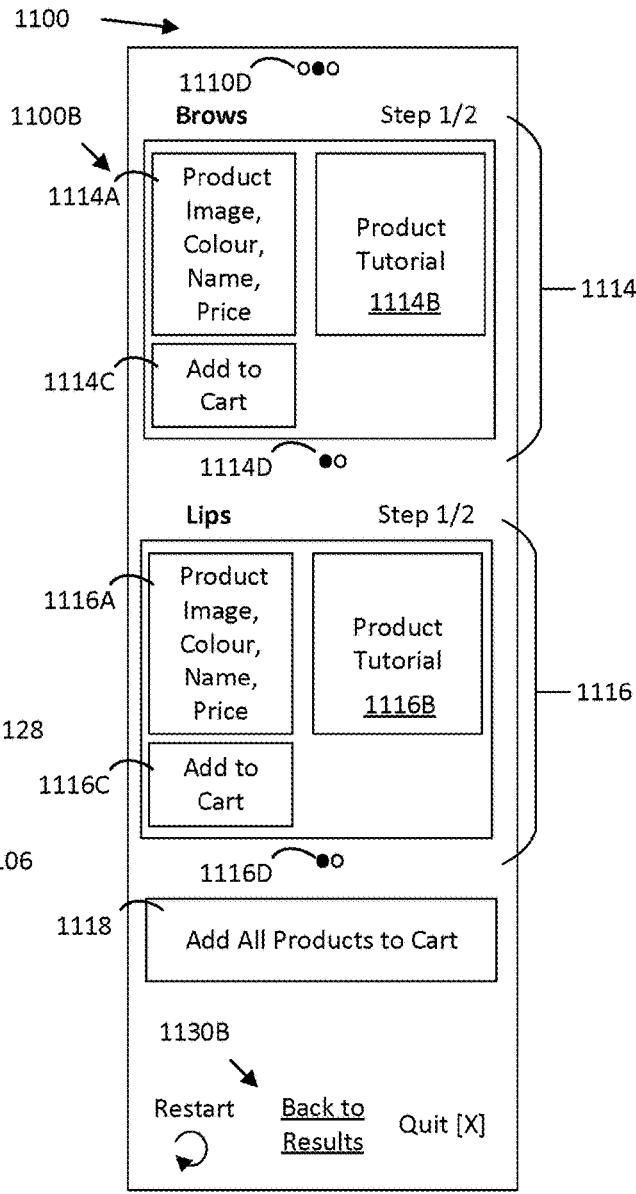
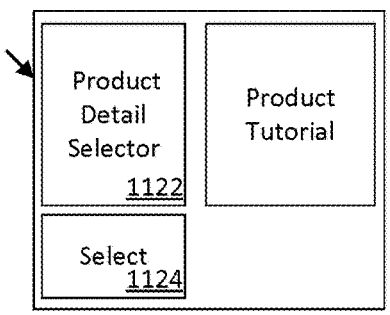
Fig. 11A
Fig. 11B
Fig. 11C

SYSTEMS AND METHODS FOR IMPROVED FACIAL ATTRIBUTE CLASSIFICATION AND USE THEREOF

CROSS-REFERENCE TO RELATED APPLICATIONS

This application claims the benefit of priority from U.S. Provisional Application No. 63/045,303 filed Jun. 29, 2020, and claims the benefit of priority from French Application No. 2010128 filed Oct. 5, 2020, the entire contents of each of which are incorporated herein by reference.

FIELD

This application relates to image processing using machine learning and more particularly to the task of facial attribute classification. Given a face image, facial attribute classification aims to estimate whether desired attributes are present in a facial portrait. Downstream applications include a variety of image processing and other applications.

BACKGROUND

Facial attribute classification (FAC) is a task that, given a face image of a subject, attempts to classify facial attributes of the given subject. FAC is of significant importance for many downstream applications, including image retrieval, face recognition, person re-identification and recommendation systems. An image of a face can be analyzed to predict multiple attributes (generally denoted as facial attributes), such as lip size and shape, eye color, etc. and others that may not be strictly limited to the face per se such as hair color, gender, etc.

Recently, due to the outstanding performance of Convolutional Neural Network (CNN), most state-of-the-art FAC methods take advantage of CNN to classify facial attributes. Roughly speaking, these methods can be categorized as follows: (1) single-label learning based FAC methods and (2) multi-label learning based FAC methods. The single-label learning based FAC methods usually extract the CNN features of facial images and then classify facial attributes by the Support Vector Machine (SVM) classifier. These methods, however, predict each attribute individually, thus ignoring the correlations between attributes. In contrast, multi-label learning based FAC methods, which can predict multiple attributes simultaneously, extract the shared features from the lower layers of CNN and learn attribute-specific classifiers on the upper layers of CNN.

SUMMARY

In accordance with embodiments there is described a deep learning supervised regression based model including methods and systems and/or computing devices for facial attribute prediction and use thereof. An example of use is an augmented and/or virtual reality interface (e.g. via a computing device or method) to provide a modified image responsive to facial attribute predictions determined from the image. In an embodiment, facial effects matching facial attributes are selected to be applied in the interface. In an embodiment, facial effects comprise make-up effects associated to make-up products. In an embodiment, an e-commerce interface provides the augmented and/or virtual reality interface and includes a recommendation component to recommend make-up products responsive to the facial attributes.

Also provided in accordance with embodiments are computer program products, which product aspect comprises a (e.g. non-transitory) storage device storing instructions, which instructions when executed by a processor of a computing device, configure the computing device to perform a method such as in accordance with any respective embodiment herein.

BRIEF DESCRIPTION OF THE DRAWINGS

FIGS. 5, 6A, 6B, 7A, 7B, 8, 9A, 9B, 10A, 10B, 10C, 10D, 11A, 11B and 11C are illustrations of display screens or portions thereof for a graphical user interface of a user application according to an embodiment.

Figure 1:
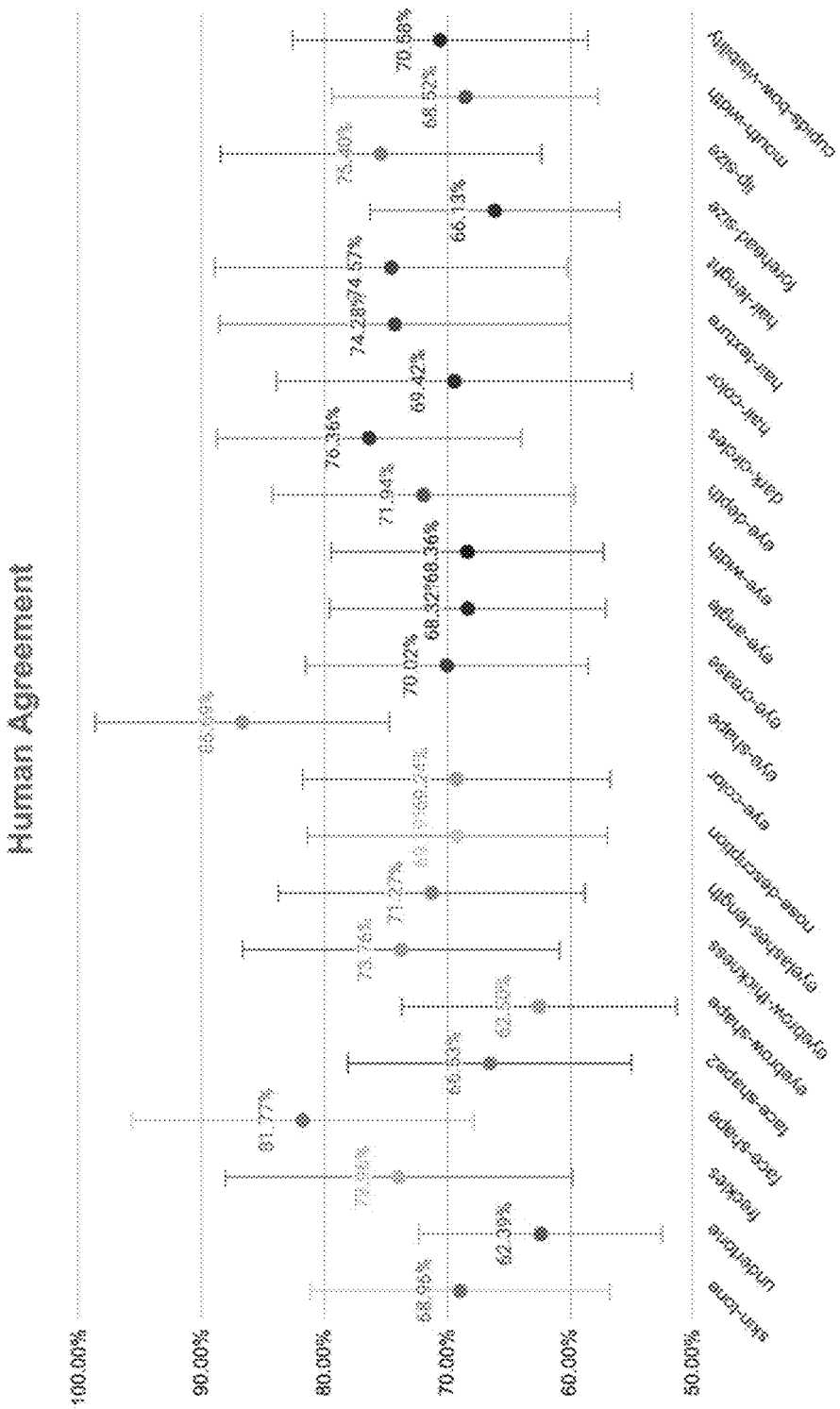
FIGS. 1 and 2 are graphs that show evaluation of human agreement when performing attribute value determination for a plurality of (facial) attributes and human performance on a facial attribute classification task for 23 facial attributes.

The present concept is best described through certain embodiments thereof, which are described herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

DETAILED DESCRIPTION

Facial attribute classification (FAC) is a task that, given a face image of a subject, attempts to classify facial attributes of the given subject. FAC is of significant importance for many downstream applications, including image retrieval, face recognition (e.g. determining if two photos show a same face), face localization and recommendation systems.

In the embodiments herein, the task is defined as classification over a predetermined set of attributes. Each attribute is described with a set of potential classes (e.g. attribute values) each subject can be classified into. For instance, a skin tone attribute has in total 6 classes: Fair, Light, Medium, Tan, Deep and Very Deep. The task on this specific attribute is thus, given an image of a person, predict which among the six classes best represents the given image.

The predetermined set of attributes can be roughly categorized as two different types: color attributes or shape attributes. Examples of color attributes include hair color, skin tone and undertone. Examples of shape attributes include eye shape, eye crease and lip size.

Recently, due to the outstanding performance of Convolutional Neural Network (CNN), most state-of-the-art FAC methods take advantage of CNN to classify facial attributes. Roughly speaking, these methods can be categorized as follows: (1) single-label learning based FAC methods and (2) multi-label learning based FAC methods. The single-label learning based FAC methods usually extract the CNN features of facial images and then classify facial attributes by the Support Vector Machine (SVM) classifier. These methods, however, predict each attribute individually, thus ignoring the correlations between attributes. In contrast, multi-label learning based FAC methods, which can predict multiple attributes simultaneously, extract the shared features from the lower layers of CNN and learn attribute-specific classifiers on the upper layers of CNN.

Unlike a typical academic setting, a system as primarily described herein and its downstream tasks mostly relate to the fashion and beauty industry. Attributes in a general academic dataset tend to cover a wider range of facial features that offer minimal value to the present task. In contrast, a new tailor-made dataset is defined by storing images with soft labels for well-designed attribute types. The new dataset contains 3790 subjects, each having one to five images taken under different environments. There are 23 attributes in total, each attribute is labeled by a plurality (e.g. 6) individual human annotators, acting independently, using soft labels as further described.

Human annotators do not always agree on particular values for instances of facial attributes. One annotator may conclude a value is average and another that it is high, for example. Thus, human performance in respect of classification tasks such as facial attribute classification may be varied. That is, humans may have different opinions or come to different conclusions about specific attribute values. In an embodiment, an attribute data set is compiled with annotations from a plurality of humans to aggregate the respective "opinions" regarding ground truth attribute values.

This approach is contrasted with traditional data set annotation approaches that use a hard or single ground truth. By way of example, one attribute relates to wrinkles having mild, moderate, or severe wrinkle values. This example illustrates a linear relationship between the values. In contrast a jaw shape is round, pointed, or squared. While these are mathematically related, what was performed in creating a new data set for the present task, is to define distinct groups or buckets for attributes that an algorithm uses for each image. Given the extreme variety of jaw shapes, the classifier algorithm comes up with a confidence for each bucket, meaning end product recommendations can use the most likely bucket, the same way a human might when deciding how to contour a customer's cheeks. Traditional approaches to this task use a "hard label" for understanding what the "correct" output for the image is, by averaging what all of the annotators had said. Instead, it is recognized there might not be a "correct" answer, using a "soft label" approach. This means while the annotators may have disagreed, the algorithm would have the flexibility to recommend all of the outputs, even if it would settle on one it believed had the highest confidence.

Figure 2:
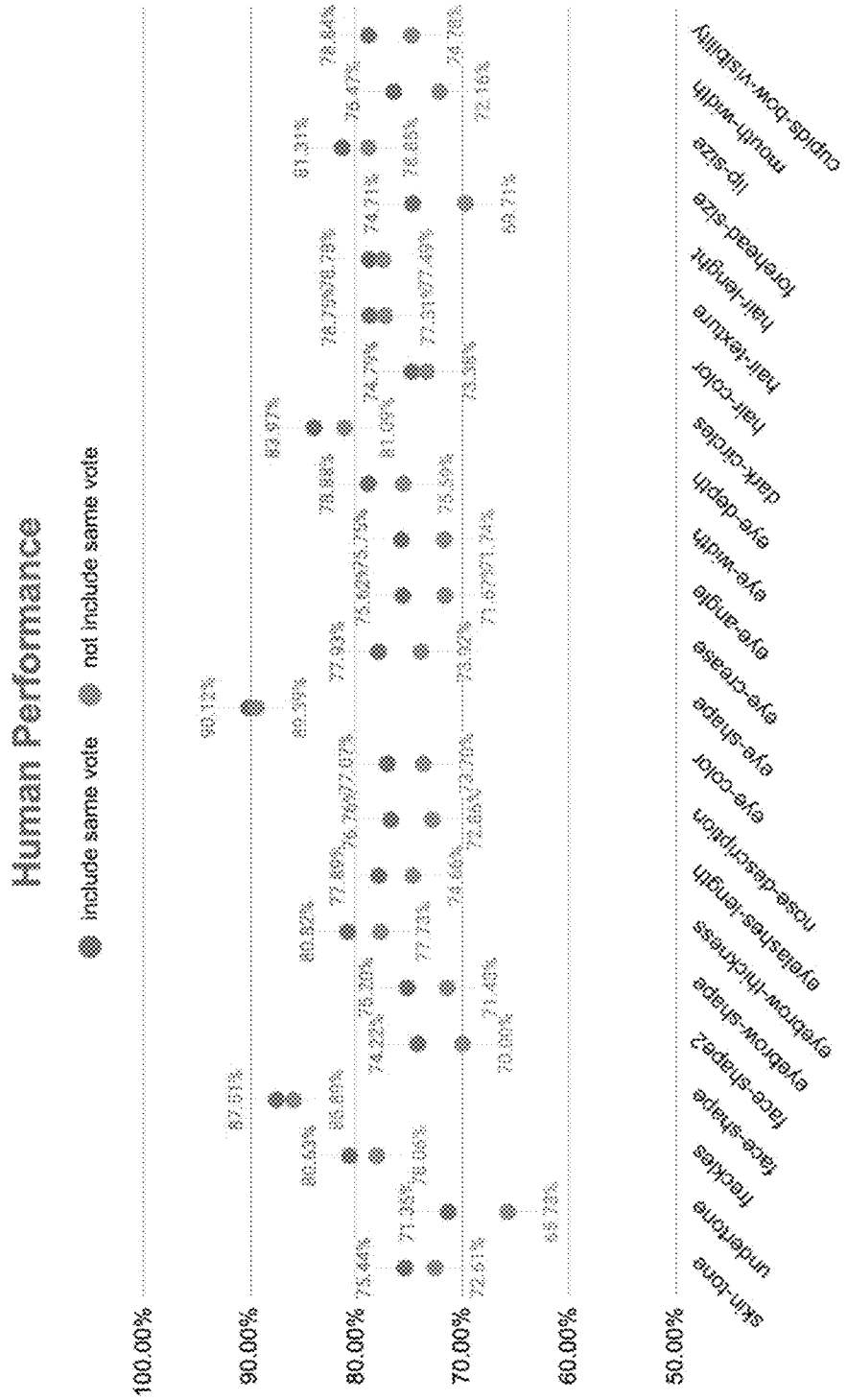

FIGS. 1 and 2 are graphs that show human agreement and human performance on a facial attribute classification task for 23 facial attributes.

Human Agreement is set to evaluate how much the annotators agree with each other. In an embodiment there are six human annotators. When annotating, not in all cases do the annotators agree well with each other. For example, for a hair color annotation, four people may say brown but two may say dark brown or even black. The first graph shows agreement and the middle point of the range is the average value. The range shows standard deviation (stddev) of the agreement. The agreement is calculated based on majority vote so for the above example of 4/2, the agreement is 66% for this specific subject on this specific attribute (hair color in example). 3/3 will be counted as 50%, and 2/2/2 will be counted as 33%. The average and stddev is then determined on each attribute over the entire dataset.

Human Performance is to evaluate how good the human themselves perform. So it's basically just "how many of them got it right". The definition of "right" is an element that is defined for an embodiment. In the embodiment it follows the majority vote. But there are instances (e.g. set of annotations for a photo) where there is not clear majority. For example, a photo, on hair color, got a 3/3 vote on 2 classes or even a 2/2/2 vote on 3 classes? There's no majority vote. In such a case, in the embodiment, there is defined two sets of metrics that named "include same vote" and "not include same vote". "Include same vote" will include cases with no majority vote, and "not include same vote" will simply disregard the cases with no clear majority. By disregarding, these instances are not included in either the numerator or the denominator of the calculation. They are ignored. "Include same vote" on the other hand, will count all top classes correct. So for 3/3, both are correct, we have a 100% for human performance. For 2/2/2, still 100%. For 2/2/1/1, 66%.

Table 1 shows the 23 attributes and values therefor:

TABLE 1

| | Attribute | Attribute value |
| --- | --- | --- |
| 1 | Skin Tone | Fair, Light, Medium, Tan, Deep, Very Deep |
| 2 | Under Tone | Neutral, Red, Yellow |
| 3 | Freckles | Not, Few, Moderate, Very |
| 4 | Face Shape | Oval, Round, Heart, Square, Long, Diamond |
| 4a | Face Length | Long, Short |
| 4b | Jaw Shape | Round, Square, Pointed |
| 5 | Eyebrow Shape | Arched, Soft Arch, Straight, Curved |
| 6 | Eyebrow Thickness | Thin, Medium, Thick |
| 7 | Eyelash Length | Short, Medium, Long |
| 8 | Nose Description | Narrow, Medium, Wide |
| 9 | Eye Color | Blue, Grey, Green Hazel, Brown, Black |
| 10 | Eye Shape | Round, Almond |
| 11 | Eye Crease | Monolid, Hooded, Neutral/Creased |
| 12 | Eye Angle | Downturned, Neutral, Upturned |
| 13 | Eye Width | Wide Set, Neutral, Close Set |
| 14 | Eye Depth | Deep Set, Neutral, Protruding |
| 15 | Dark Circles | No, Yes |
| 16 | Hair Color | Bald, White, Grey, Light Blonde, Blonde, Brown, Dark Brown, Black, Strawberry, Copper, Red, Auburn, Other |
| 17 | Hair Texture | Straight, Wavy, Curly, Frizzy/Afro, Bald |
| 18 | Hair Length | Very Short, Short, Medium, Long, Very Long, Bald |
| 19 | Forehead | Short, Average, Long |
| 20 | Lip Size | Thin, Medium, Full |
| 21 | Mouth Width | Narrow, Average Wide |
| 22 | Cupid's Bow Visibility | Flat, Medium, High/Heart |

Face shape is a secondary attribute that is predicted by combining signals from predictions on facial attributes 4a (Face Length) and 4b (Jaw Shape). For example, Oval=Long face+Round jaw and Round=Short face+Round jaw.

For training purposes the data is split into training, validation and testing subsets, which contain 2274, 758 and 758 subjects accordingly.

The apparent face architecture prediction problem is cast as a supervised regression problem for computer implementation using deep learning. Attributes are assessed from one to five images from the same individual.

To effectively exploit the intrinsic relationship and heterogeneity of facial attributes, the attributes can be divided into different groups. In accordance with an embodiment, the attributes were divided into two separate groups: color attributes (such as hair color, eye color and undertone) and shape attributes (such as lip size, eye crease and nose type). Two sub-models were trained that share a similar architecture on each group of attributes. During inferencing, the predictions (for each respective attribute) are aggregated at the end. For convenience, the two sub-models, one for color and one for shape, are aggregated to form a super model for facial attribute classification. However, either one of the sub-models is useful if only the respective attributes are desired for classification.

The two sub-models (e.g. shape sub-model and color sub-model) share the same structure but are trained on different pre-processed data (here pre-processing means any data augmentation before the start of training, it includes but is not limited to face detection and face cropping, resizing, etc.). For color signs, because attributes like hair color and skin tone also need the background to guide the color extraction (e.g. in a shady environment light skin toned image may be wrongly classified as dark skin tone if the background is cropped out), the dataset is preprocessed to have more background than that of the shape attributes. The shape model is trained on cropped out face with minimal background but the color model included more background information.

In an embodiment, preprocessing in the two sub models comprises:
1. Converting the original image to RBG space;
2. Detecting the face present in the image. (Any standard face detection algorithm should work); This is optional for the color but will assist with accuracy;
3. Resizing the face box—Color model: enlarge the detected face box to 1.7× width and height, Shape model: enlarge the detected face box to 1.2× width and height; and
4. Resizing the image from step 3 to an input size of the model.

Thus, the data set is used to train two algorithms by bucketing related signs: color related signs, and shape related signs. This meant the algorithms learned from signs that were related. For example, people with light hair frequently have blue eyes, and people with dark skin frequently have brown eyes. However, people with blue eyes might have any face shape possible, with little correlation. The resulting code for each algorithm is very small and very fast, by reusing related calculations for the related signs and making connections between the related signs. The two algorithms together create a complete picture of the user's face characteristics while not overcomplicating each other.

Figure 3:
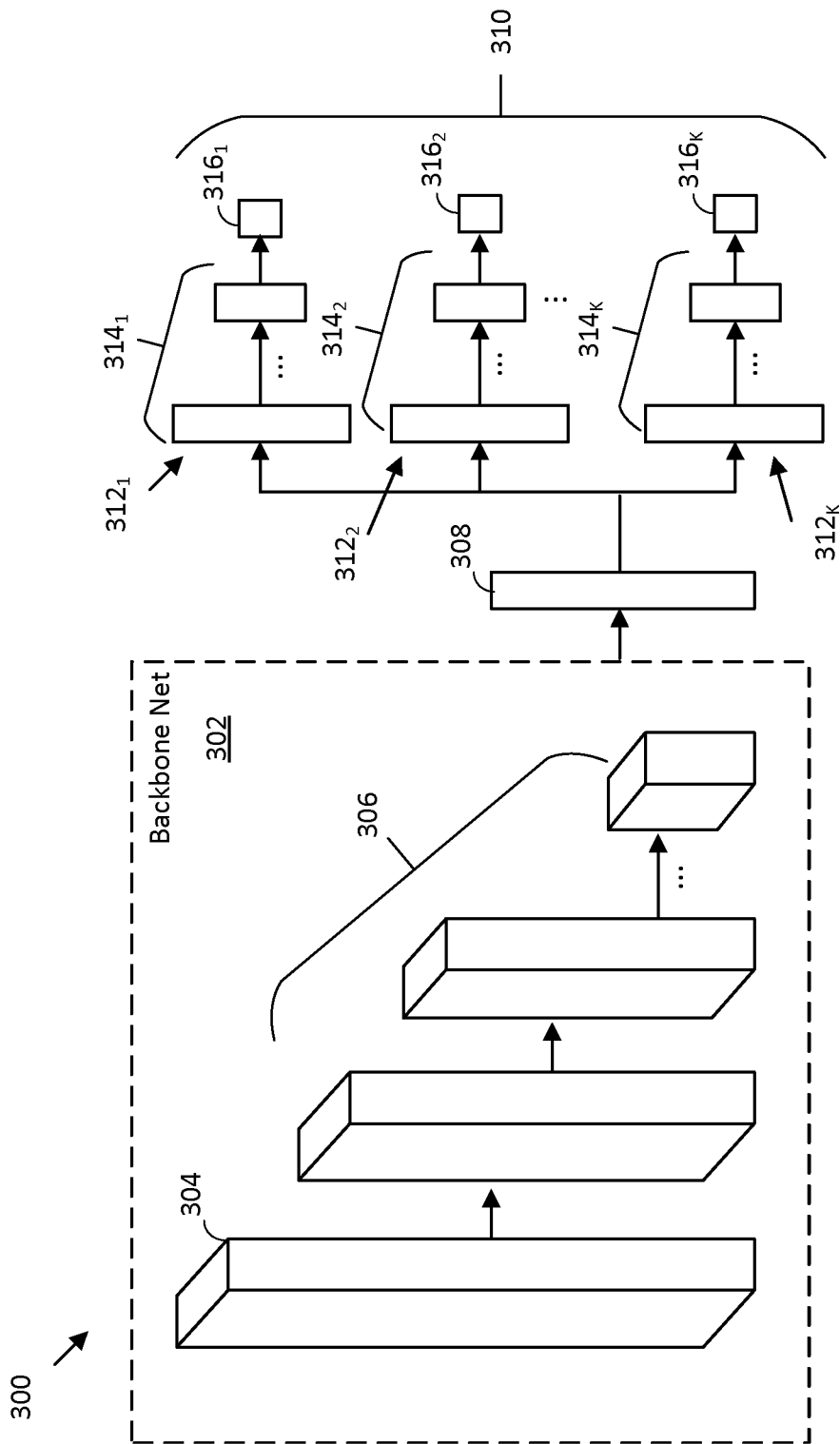
FIG. 3 is a block diagram illustrating a deep learning network architecture according to an embodiment.

FIG. 3 is a block diagram illustrating the deep learning network architecture. The 300 network comprises a convolutional neural network (CNN) 302 for processing a source image at an input layer 304. In an embodiment, CNN 302 is configured using a residual network based backbone having a plurality of residual blocks 306, to extract the shared features. By way of example, the residual network based backbone is configured using ResNet ("Deep Residual Learning for Image Recognition", He, Kaiming et. al, 2015 Dec. 10, available at URL arxiv.org/abs/1512.03385). In an embodiment, models pre-trained on ImageNet (a database of organized images available from Stanford Vision Lab, Stanford University (URL image-net.org)), for example, are adapted and used as backbone nets. The last several prediction layers of such models are removed to adapt the models for the purpose at hand—e.g. as an encoder to generate shared feature data as desired.

A flattened feature vector 308 (for example, using average pooling) is obtained from the backbone net 302. For example, in an embodiment, from a ResNet18 based backbone feature net, the output has a vector of dimension 7×7×512 for an image of size 224×224. Average pooling provides, in an embodiment, a flattened vector of 1×512 by taking an average of the 7×7 terms at each of the 512 positions.

The feature vector 308 is duplicated for processing (e.g. in parallel) by a plurality (K) of classifiers 310 for each of the K facial attributes. Each individual classifier (e.g. $312_1$, $312_2$, . . . $312_K$) comprises one or a plurality of fully connected linear layers ($314_1$, $314_2$, . . . $314_K$) and a prediction block ($316_1$, $316_2$, . . . $316_K$) to output a final prediction for each attribute. In the shape model, each classifier head consists of 2 fully connected linear layers with rectified linear unit (ReLU) activations. The hidden layer size is 50. (This means that, assuming the feature size is N, the first FC layer will squeeze the feature to a size of 50, then the second FC layer will work on the size 50 feature and output a feature vector with size equal to the target output size). In the color model, each classifier head consists of only one FC linear layer. (Directly convert feature with size N to the target output size). Typically, the deeper the model (i.e. the more layers are present), the higher the capacity of the model. Shape attributes are relatively more complex than color attributes in terms of learning difficulty to account for the difference in number of fully connected layers.

During use at training and/or at inference time, in an embodiment, the model is used to process a group of N images at one time. Output then has the dimension of (N, K) where N is the number of input images and K is the number of attributes. Each element in the output matrix is an integer and the Oi,j represents that, for i-th image and j-th attribute, which class the system predicts the image belongs to. In an embodiment, N is a training hyper-parameter for a learning rate. Each of the N images comprises a same or different faces. The model does not have context on identity nor does it resolve contradicting predictions results across multiple images of a same face.

Within each of the classifiers for the respective attributes, a layer before the final output layer produces a set of predictions (like a score value) across the set of possible attribute values. In an embodiment, each prediction is a relative likelihood regarding the "truth" of the attribute value. For a set of three attribute values, a set of predictions may be 20, 20, 60, though often predictions are normalized over a different scale. The final prediction is determined from a max value of the set of prediction values (e.g. the attribute associated with 60).

As noted, the annotated dataset used for the supervised learning has annotations by 6 human annotators acting independently. As noted, the annotations for a particular attribute are not identical by each annotator. A "truth" resolving rule is used to select among the annotation values (soft labels). One rule is a most common prediction rule— choosing the most commonly predicted attribute from set of predictions. One rule is a top two most common prediction rule.

For color models, in an embodiment, "true" is treated as the "most common vote". This means, with the following annotations for eye color: "blue", "blue", "blue", "grey", "grey", "brown": If the model predicts "blue", there is an alignment with the most common vote. If the model predicts "blue" or "grey", there is an alignment with the top two most common votes. If the annotations were: "blue", "blue", "grey", "grey", "brown", "black", then either "blue" or "grey" would be the most common vote (and top 2 most common votes).

Table 2 shows outputs and evaluations for a model for predicting color attributes as trained. Attribute outputs annotated with an "*" represent outputs that are rarely predicted by the model. In an embodiment, additional training data is utilized to improve such predictions. In an embodiment, another approach includes combining or bundling these granular predictions together or with more common (and related) predictions, reducing granularity or fineness of the predictions. For example, in an embodiment, "strawberry", "red", and "auburn", are co-bundled.

TABLE 2

| | Percentage Matching Most Common Vote | Percentage Matching Top Two Most Common Votes | Outputs |
|---|---|---|---|
| Skin Tone | 0.84180 | 0.95508 | fair, light, medium, tan*, deep, very deep* |
| Undertone | 0.64355 | 0.89160 | neutral, red, yellow |
| Hair Color | 0.70752 | 0.87451 | copper*, dark brown, strawberry*, black, brown, undetermined, blonde, light blonde, auburn*, white, red*, other*, grey, bald |
| Eye Color | 0.69531 | 0.88281 | black, brown, green, grey, hazel*, blue |

For the shape model, the most common vote was also treated as the ground truth. Two evaluation standards (prediction resolving rules) were used: "percentage matching majority vote only" and "percentage matching most common vote".

The "percentage matching most common vote" will calculate the accuracy on all the samples in the testing set when all the maximum voted classes are treated as "ground truth".

The "percentage matching majority vote only" will only calculate the accuracy on the samples who have only one majority voted class.

Table 3 shows outputs and evaluations for a model for predicting shape attributes as trained.

TABLE 3

| | Percentage Matching Majority Vote Only (i.e. not include same vote) | Percentage Matching Most Common Vote | Outputs |
|---|---|---|---|
| Eyebrow Shape | 0.6717 | 0.7124 | straight, curved, arched (+soft arch) |
| Eye Shape | 0.9333 | 0.9406 | round, almond |
| Eye Crease | 0.7543 | 0.8021 | Monolid, Neutral/creased, Hooded |
| Face Length (faceshape1) | 0.8459 | 0.8668 | longer, larger |
| Jaw Shape (faceshape2) | 0.6604 | 0.6953 | pointed, round, square |
| Lip Size | 0.8346 | 0.8377 | thin, medium, full |

Figure 4:
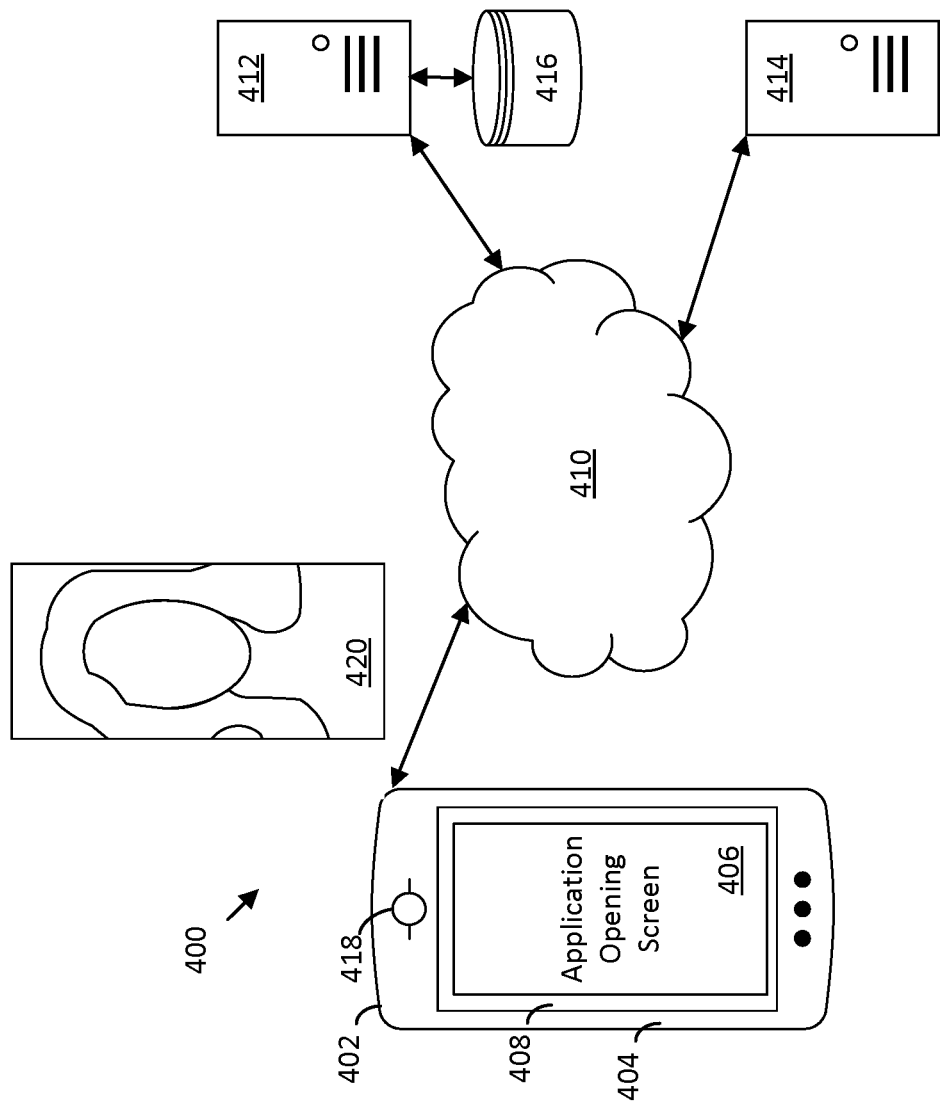
FIG. 4 is a block diagram illustrating a computing system, e.g. a network, according to an embodiment.

FIG. 4 shows, in an embodiment, a computing system 400 providing a recommendation application responsive to facial attribute classification. The application is an e-commerce application. Further, through image processing techniques, such as by using a deep learning network model, the application provides facial effect simulation to present the recommendations contextually. The application provides a virtual and/or augmented reality experience to the user.

In system 400 there is shown a user computing device 402. User computing device 402 is shown in the form of a smart phone. Other form factors are useful such as a tablet, personal computer, etc. User computing device 402 is a consumer-oriented device such as is available from Apple Inc., Samsung Electronics Co., Ltd., etc., that are useful for an e-commerce application such as application 404. In an embodiment, device 402 is a product counter kiosk device operated by a salesperson, etc.

In an embodiment, user computing device 402 comprises a computing device having various components coupled for communication including at least some of: processor(s) (e.g. CPU, GPU, etc.), storage device(s), one or more communication subsystems or devices, display(s), input device(s), output device(s), etc. In an embodiment, a display is touch or gesture enabled, input devices include a pointing device such as a mouse, a microphone, a camera, a keyboard, button(s), etc. and communication devices provide any of wired or wireless communications and are short and/or long range enabled. In an embodiment, communication devices couple to a location device such as to provide satellite based location services. In an embodiment, output devices include a speaker, lights, vibration/haptic devices, etc. and the various components are coupled via one or more communication buses or other structures.

In an embodiment, the storage devices store instructions and data, for example, which instructions when executed configure the operation of the computing device. The instructions define an operating system, applications, etc. Data includes one or more source images of a face. In addition to application 404, in an embodiment, there is one or more applications for communicating message (data) such as emails, text messages, instant messages, short message service (SMS) messages, etc. In an embodiment, communications include attachments such as images or videos etc.

In an embodiment, Application 404 provides a graphical user interface including one or more screens (e.g. 406) for display by a display device (e.g. 408) as part of or coupled to user computing device 402. In an embodiment, user computing device 402 and application 404 is gesture and/or voice or otherwise enabled. In an embodiment, Application 404 is a native application, configured specifically for the user device and it's operating system, downloaded and stored thereon or more device agnostic such as in the form of a browser-based application and/or provided as a web service.

In an embodiment, application 404 communicates (using device 402) via a network 410 using, Internet Protocol (IP), for example, with one or more servers such as e-commerce server 412 and image processing server 414. System 400 is simplified: payment and other services are not shown, only one user computing device is shown, etc.

In an embodiment, servers 412 and 414 are provided by respective computing devices (though one such device could be used) with suitable resources as is known. A suitable computing device has various components coupled for communication including at least some of: processor(s) (e.g. CPU, GPU, etc.), storage device(s), one or more communication subsystems or devices, display(s), input device(s), output device(s), etc. In an embodiment, a display is touch or gesture enabled; input devices include a pointing device such as a mouse, a microphone, a camera, a keyboard, button(s), etc.; communication devices provide any of wired or wireless communications and are short or long range enabled. In an embodiment, communication devices couple to a location device such as to provide satellite based location services and output devices include any of speaker, lights, vibration/haptic devices, etc. The various components are coupled via one or more communication buses or other structures. In an embodiment, the storage devices store instructions and data, for example, which instructions when executed configure the operation of the computing device.

In the present embodiment, application 404 is an e-commerce application for make-up products. Application 404 is configured to provide a source image to obtain facial attribute analysis and to receive product recommendations responsive to the facial attributes determined from the source image. Server 414 is configured to receive the source image (either from device 402 without communication to server 412 or via server 412) and perform a method to determine the facial features.

Server 414 processes the source image of a face using a network model performing deep learning and supervised regression to output a prediction for each of the facial attributes.

In an embodiment, the network model comprises a convolutional neural network (CNN) model comprising residual blocks performing deep learning to produce a feature vector of shared features for classification by respective classifiers to predict the facial attributes. Duplicates of the feature vector are made to be processed by a respective classifier for a respective one of the facial attributes. In an embodiment, the network model comprises a plurality of respective classifiers, each of the respective classifiers comprising one or more fully connected linear layers, wherein each of the respective classifiers providing as output a prediction of a respective one of the facial attributes. The plurality of respective classifiers, in an embodiment, perform in parallel to provide the facial attributes.

In an embodiment, the facial attributes are associated to a plurality (e.g. two) of respective attribute groups in accordance with an intrinsic relationship and heterogeneity of the facial attributes (e.g. color or shape, etc.) In an embodiment, server 414 is configured such that the method uses a respective network model configured for a respective one of the attribute groups to process the source image.

In an embodiment, one of the respective attribute groups is a color attribute group for color-based facial attributes and the source image is processed by a color-based network model. In an embodiment, one of the respective attribute groups is a shape attribute group for shape-based facial attributes and the source image is processed by a shape-based network model.

In an embodiment, the network model comprises an adapted pre-trained ResNet-based image processing network model trimmed of prediction layers.

Though server 414 provides the facial attributes for use to provide product recommendation in the present example, in other embodiments, the server provides the facial attributes for use by an application performing any one of image retrieval, facial recognition, personal re-identification and product and/or service recommendation, etc.

In an embodiment, server 414 is configured to process the source image of a face using a convolutional neural network (CNN)-based backbone network model having residual blocks to produce a feature vector of shared features; and process the feature vector using a plurality (K) of classifiers, one for each of K respective facial attributes to be determined, each respective classifier comprising one or more fully connected linear layers and a prediction block to output a prediction of one of the K respective facial attributes. In an embodiment, a first network model (e.g. a sub model) processes the source image for color-based facial attributes to produce a color-based feature vector for processing by respective ones of the plurality of classifiers configured to predict color-based facial attributes and a second network model processes the source image for shape-based facial attributes to produce a shape-based feature vector for processing by respective ones of the plurality of classifiers configured to predict shape-based facial attributes.

While shown as a client/server model where user computing device provides a source image (e.g. from a camera or other upload (e.g. from a storage device), where server 414 performs the face attribute detection service, in an embodiment, the user computing device, if sufficiently robust, is configured with deep learning model to perform the classification.

In an embodiment, server 412 provides product recommendations for an e-commerce service. Server 412 provides an e-commerce shopping service to purchase at least some of the product recommendations.

In an embodiment, server 412 is configured to recommend products for an e-commerce service such as by: receiving a plurality of facial attributes determined from a source image of a face, the source image processed using a facial attribute classifying network model to produce the plurality of facial attributes; using at least some of the facial attributes to select at least one product from a data store storing products in association with facial attributes suited to the products; and providing the at least one product as a recommendation for presentation in an e-commerce interface to purchase products.

In an embodiment, the facial attributes are determined using server 414 and/or the method(s) described for server 414.

In an embodiment, the products comprise make-up products. The make-up products are variously associated in a data store (e.g. database 416 coupled to server 412) to define predetermined make-up looks. Looks are defined from make-up having specific effects and/or applied using specific techniques. Each look is defined from (e.g. to include) make-up of different types. The types relate to skin areas (regions) of the face (cheeks, nose, chin, forehead, jawline, etc.) or to regions such as eyes, lips, and brows including hairs such as eyebrows and eye lashes. The face region (skin), eye region, brow region, lip region, etc. are associated to facial attributes including shape, colour, as described. Respective make-up products for respective regions are associated to the respective attributes, for example, such as by using a suitability measure for the attribute. The measure may be binary e.g. "good for" or "not good for" or the suitability measure may be more granular (e.g. ranked on a scale of 1 to 10 or other scale). In an embodiment, a look comprises respective products for multiple regions of the face (e.g. all regions). The products for the look have measures associated to facial attributes (e.g. lip products to lip attributes of shape and colour, brows products to brows attributes, etc.) A recommendation function may use rules or other manners to match facial attributes determined from image analysis of a user image to products grouped in respective looks. In an embodiment, a match to facial attributes identifies a potential look. More than one look may be identified from the initial matching. Identified looks may be ranked, for example, based upon a count of the facial attribute matches for a respective look and/or quality of the facial attribute match evaluating the scale of the match. Ranking may be used to order presentation of looks and/or provide a score. In an embodiment, a look may be selected and facial attribute information used to determine matching products that are useable to achieve the look (e.g. when combined on a face). Ranking may be used to order or score the respective products to be used to achieve the look.

In an embodiment, server 414 receives an identification of one of the predetermined make-up looks. When using at least some of the facial attributes, server 412 is responsive to the one of the predetermined make-up looks when selecting the at least one product.

In an embodiment, as each of the make-up products is associated with one of a plurality of make-up types, server 412 selects at least one product, responsive to the facial attributes, for each of the make-up types to define the recommendation. As noted, the make-up types comprise a face product type, an eye product type, a brow product type and a lip product type.

In an embodiment, server 412 recommends a technique to use the recommended products.

In an embodiment, server 412 provide its output to (user) computing device 402 for application 404. The output is presented via display 408 such as through a graphical user interface of the e-commerce service.

To enhance the user's perception of the look or an individual make-up product, in an embodiment, the source image is modified such as through image processing to present a facial effect. The source image is modified by server 412 or by server 414 or by user computing device 402 such as is described in the embodiments herein. A deep learning network model modifies the source image or other image processing techniques are used as described in the embodiments herein. One such deep learning network model for modifying a source images to translate from one domain to another while maintaining source features is a generative adversarial network (GAN) based model.

In an embodiment, application 404 enables a user computing device 412 to perform a method to simulate a reality. The method comprises: determining a plurality of facial attributes from a source image of a face, processing the source image using a facial attribute classifying network model; determining at least one facial effect for application to the face responsive to at least one of the facial attributes; and processing the source image to apply the at least one facial effect to the face for display. In an embodiment, application 404 communicates with one or both of servers 412 and 414 to have the method steps performed for it. User computing device 402, in an embodiment, uses a camera 418 to generate the source image (e.g. 420).

In an embodiment, the at least one facial effect is a simulation of at least one make-up product and/or technique to be applied to the face. In an embodiment, other facial effects comprise the application of a prosthesis, plastic surgery, or eyewear, etc.

In various embodiments, processing the source image to apply the at least one facial effect comprises using a deep learning network (e.g. GANs-based) configured to apply the facial effect or other deep-learning models or other image processing techniques are used. By way of example but without limitation, an augmented reality (AR) virtual try on method configured in a (client-side) computing device is used to simulate an effect associated with a recommended product or service on a source image, giving a virtual try user experience. By way of summary, a camera frame or photo (e.g. as a source image) as well as rendering values (such as a red, green blue (RGB) color and color opacity) which represent makeup products are received as input to the method. The source image is processed, using face tracking, to determine key landmarks around a user's face in the source image. Using these landmarks, areas of the face relative to a makeup product, are masked out such as the user's lips for a lip related product. Next, the rendering values are used to draw the makeup onto the user's face in the masked out area. In an embodiment, other steps are included, such as sampling the lighting from the source image, blending, etc. to realistically render how the actual products would look. Finally, a result—an altered source image with a makeup or face effect—is passed back as output that can be displayed.

In an embodiment, FIGS. 5, 6A, 6B, 7A, 7B, 8, 9A, 9B, 10A, 10B, 10C, 10D, 11A, 11B and 11C show screens or portions thereof for a graphical user interface of application 404.

Figure 5:
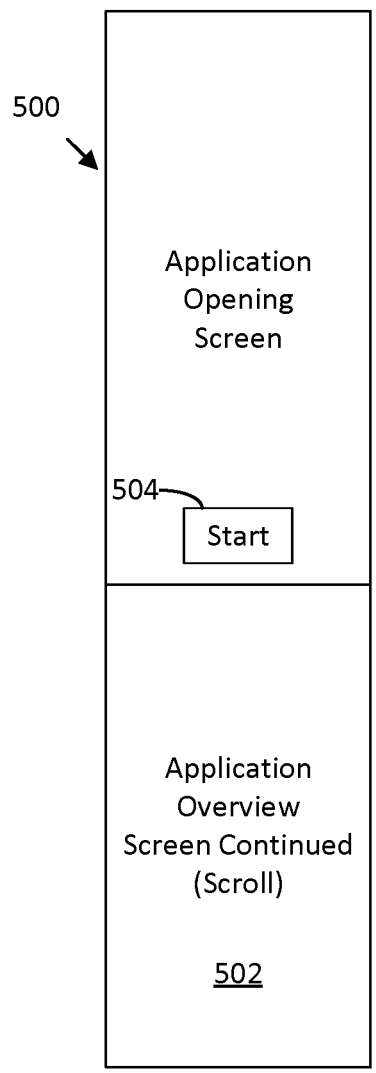

In the embodiment, FIG. 5 shows an application opening screen 500, which content does not all fit (is not all displayable) on the display screen 408 of the user computing device 402. Portions are scrollable as is known such as a portion 502 providing an application overview. A control 504 is provided to advance the application (e.g. start).

Figure 6A:
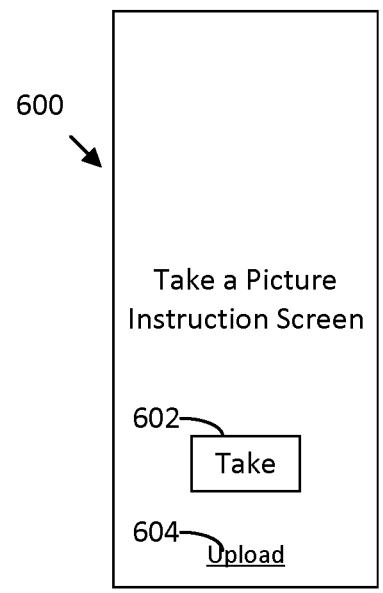
Figure 6B:
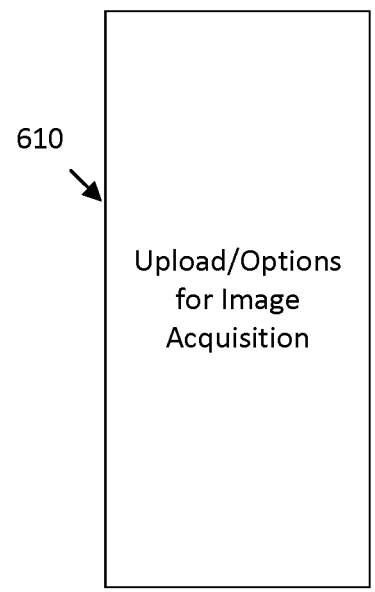

In the embodiment, FIG. 6A shows an initial screen 600 (e.g. a "take a picture instruction screen") to acquire a source image (e.g. 420). The image is a "selfie" via camera 418. A "take" control advances to initiate a picture taking interface (See FIG. 7). An upload control 604 advances to an upload interface such as to acquire an image from local storage device of device 402 or otherwise via screen 610 (e.g. "upload/options for image acquisition") and FIG. 6B.

Figure 7A:
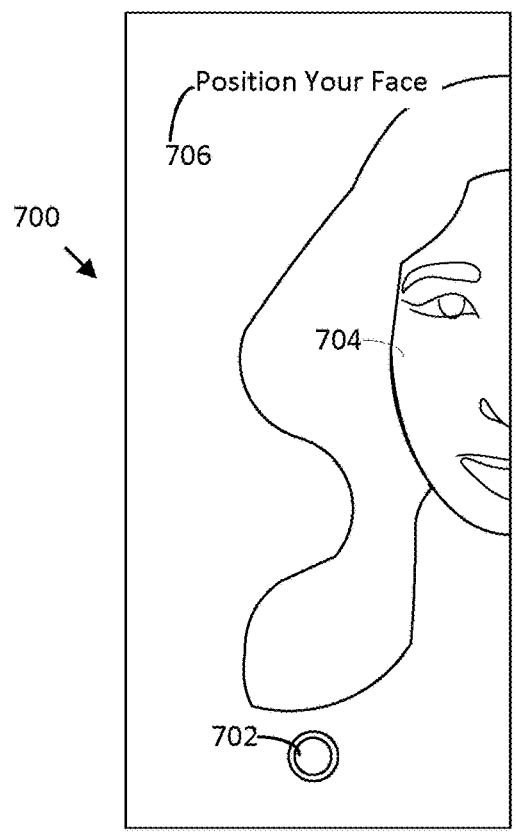
Figure 7B:
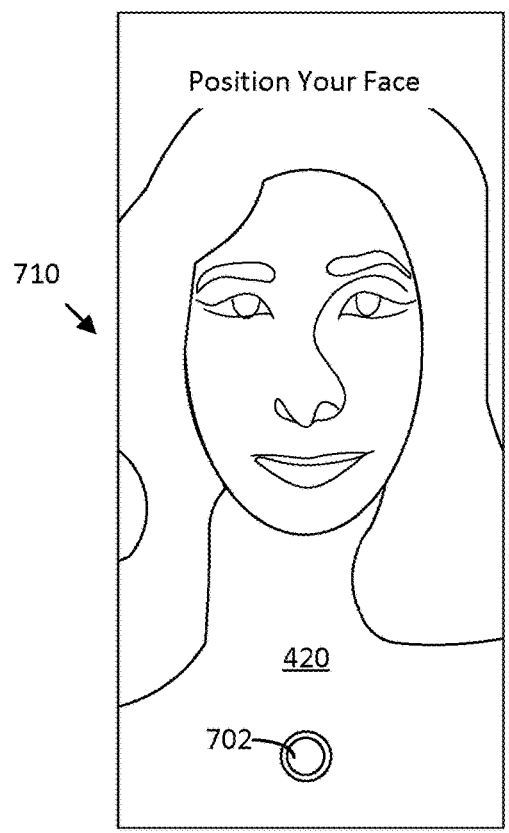

In the embodiment, FIGS. 7A and 7B show a picture taking interface (e.g. screens 700 and 710 respectively) for capturing (e.g. receiving from a camera) an image of a face 704.

An image capture control 702 invokes the camera 418 to acquire the source image 420. Other controls are not shown such as ones to switch to a back (opposite facing) camera mode. In the embodiment, instructions are presented to assist the user to position the face appropriately, to minimize make-up wearing, to minimize hair or other objects from occluding the face, and to use proper lighting, etc. An example of instructions is "position your face" 706, which may overlay a presentation of the face before the image is taken. Once the image is captured, an initial processing is performed to confirm face position and lighting and request a retake (not shown). In the embodiment, source image 420 is communicated such as to server 414 for processing to determine facial attributes as described.

Figure 8:
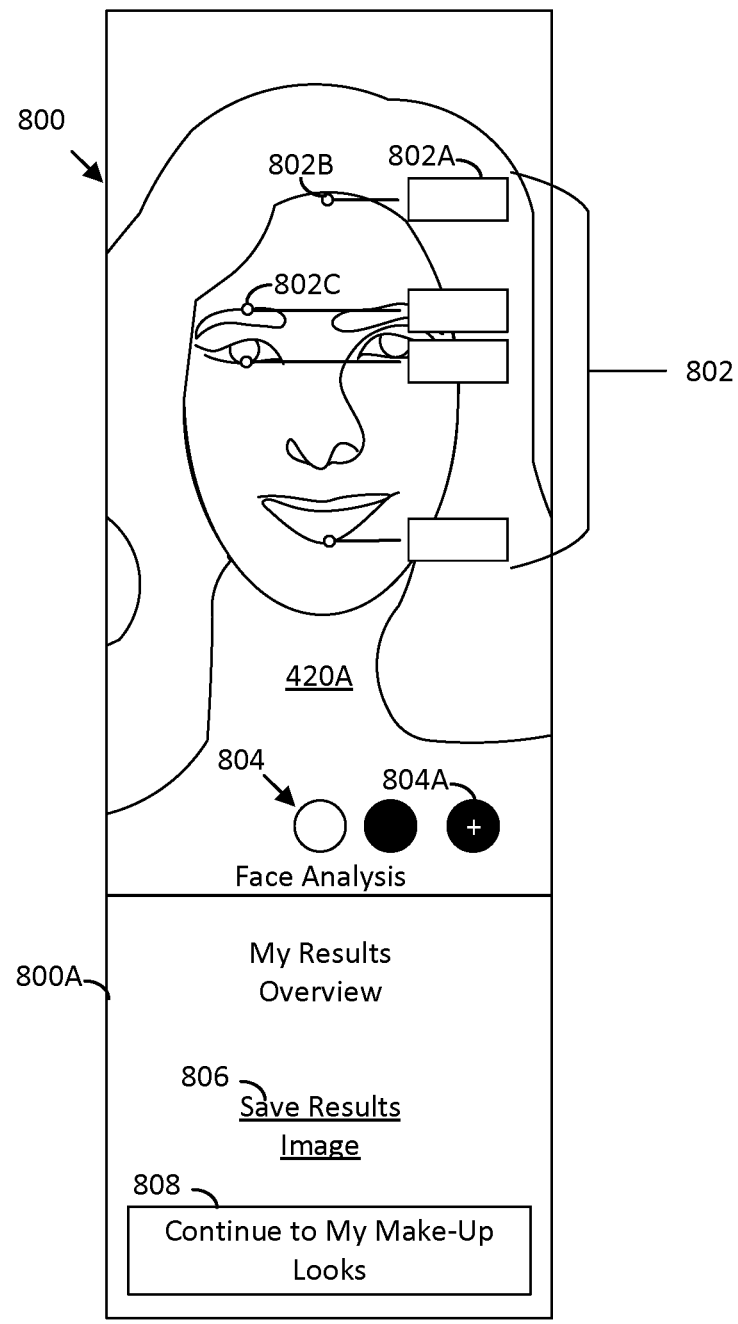

In the embodiment, FIG. 8 shows an interface (e.g. a screen 800) for face analysis for presenting facial attributes determined from the source image 420. In the present interface, the source image is presented as modified (420A) to present (e.g. overlay) information 802 about facial attributes. Facial attribute information 803 is presented contextually and in association with regions of the face 420 related to the attributes. In the embodiment, the facial attribute information identifies the attribute and associated value from Table 1 as determined for the source image 420. The overlay styles and control position in the screens herein are examples.

In the embodiment, the regions are located on source image 420 such as by image processing, for example, performing feature detection to locate the region. The locations are determined by device 402 or server 414, for example. The regions relate to the overall face, to the brows, the eyes, and the lips, for example. These regions relate to one or more specific facial attributes. In the embodiment, each region relates to a respective product type.

In the embodiment, individual information (e.g. 802A) is associated with a control (e.g. tap control 802B) to advance to an associated region interface. Each associated region interface is configured to provide additional information about the facial attributes and related products, etc. for the region as shown. See FIG. 9A (associated to control 802B) and FIG. 9B (associated to control 802C). In an embodiment, each region has a respective region interface.

Respective (tap) controls 804 are also provided to advance to an associated region interface providing additional information about the facial attributes and related products. In the embodiment, controls 804 are advanced (invoked) such as by a swipe gesture (e.g. left/right) and/or a touch of an advancement control (e.g. 804A).

In the embodiment, scrolling brings further information (e.g. a "My Results Overview" portion) and controls in portion 800A of interface 800. In the embodiment, a save control 806 (e.g. Save Results Image) is provided to save the annotated image 420 and/or the results of the facial attribute analysis to a storage device of device 402. Control 808 (e.g. "Continue to my Make-up Looks") advances to a recommendation interface (e.g. FIG. 10A). It is apparent that various interface portions and elements such as controls may have text labels to assist with interface navigation and user interface understanding.

Figure 9A:
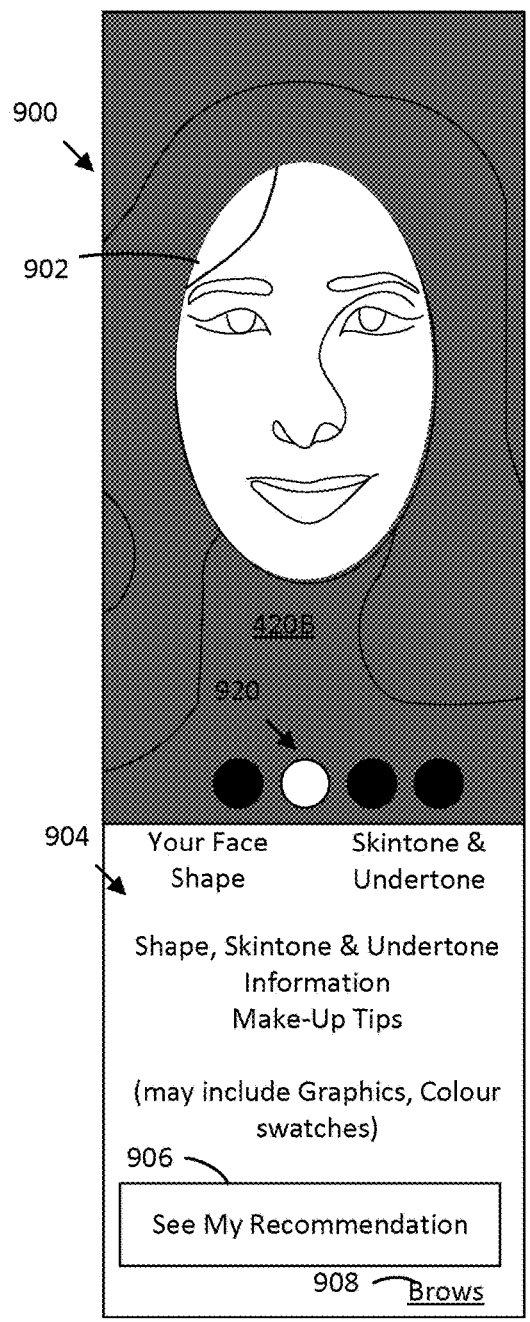

In the embodiment, FIG. 9A shows a region interface 900 to highlight visually the region 902 related to the facial attributes of the face overall and provide further information (e.g. in portion 904) such as face shape, skin tone, undertone (e.g. "Shape, Skintone,& Undertone Information Make-Up Tips). Additional information in portion 904 relates to associated products for the region 902 and comprises graphics and/or text, color swatch images, etc. In the embodiment, a control 906 is provided (e.g. "See My Recommendations") to advance to product recommendation interface (e.g. FIG. 10A). A control 908 is provided to advance to another region interface such as for brows (e.g. FIG. 9B).

Figure 9B:
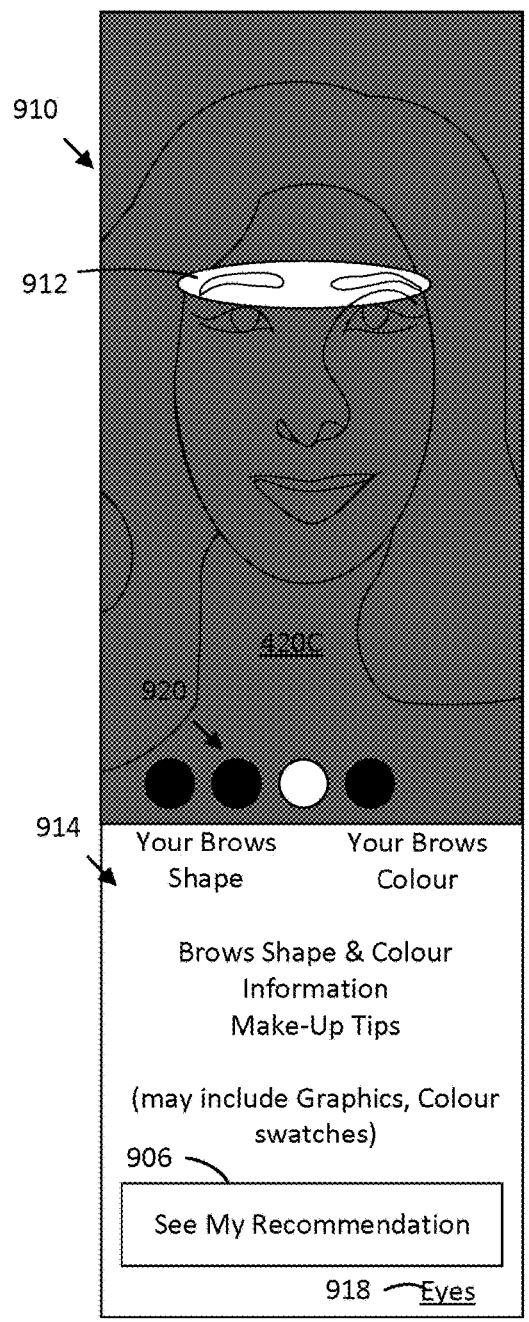

In the embodiment, FIG. 9B shows a region interface 910 to highlight visually the region 912 related to the facial attributes of the brows and provide further information in portion 914 such as brow shape, brow color (e.g. "Brows Shape & Colour Information Make-Up Tips"). Additional information in portion 914 relates to associated products for the region 912 and comprises graphics and/or text, color swatch images, etc. A control 906 is provided (e.g. "See My Recommendations") to advance to product recommendation interface (e.g. FIG. 10A). A control 918 is provided to advance to another region interface such as for eyes (region interface for eyes not shown). Controls 920 are provided for advancing to specific region interfaces or the "My Results" interface (e.g. FIG. 8). Advancing to specific region interfaces may be navigated by swiping, or taping one of controls 920, for example.

For the region interfaces (e.g. 900 and 910) the regions (902, 912) of interest are located on source image 420 (e.g. via an overlay). Image processing, for example, performs feature detection to locate the regions. In the embodiment, a respective mask is defined to overlay the source image 420 to define a respective modified image 420B, 420C. In the embodiment, the mask darkens regions outside the region (902, 912) of interest, by way of example, to bring focus to the respective region.

Though not shown, in the embodiment, region interfaces are provided for lips and eyes. A lip region interface presents lip size information and shows and/or describes lip shape information. An eyes region interface presents eye shape, eyelid and eye color information. As in all of the illustrated region interfaces, product tips are also provided (e.g. that relate to the applicable facial attributes associated to the region).

Figure 10A:
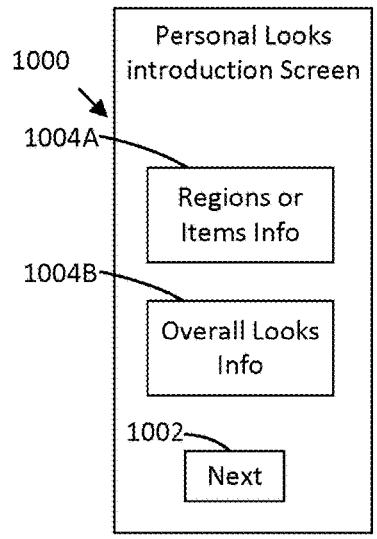
Figure 10B:
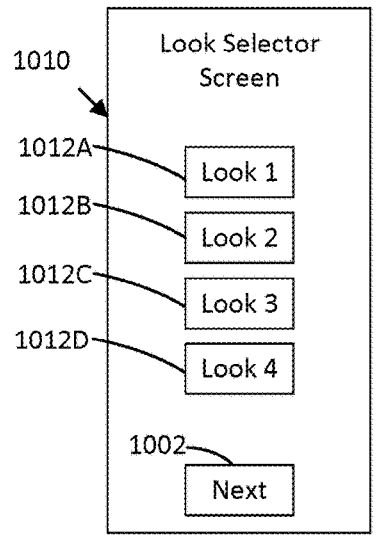
Figure 10C:
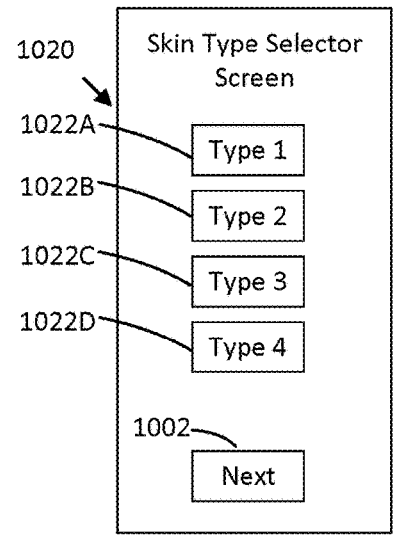
Figure 10D:
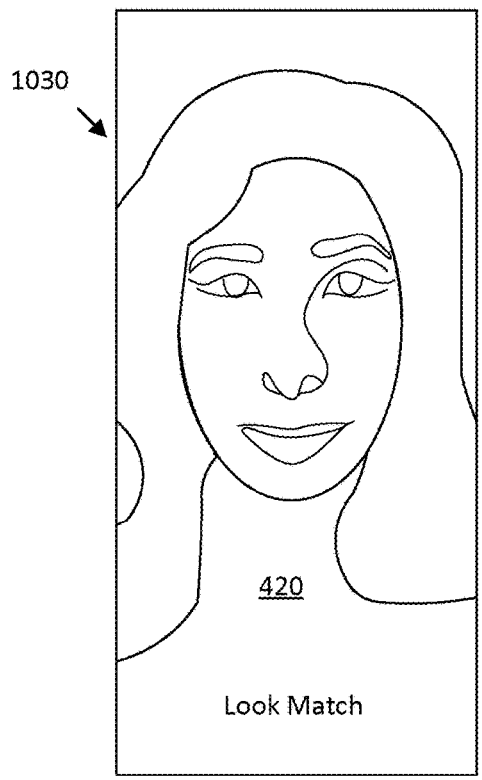

In the embodiment, FIGS. 10A-10D illustrates initial screens 1000, 1010, 1020 and 1030 of a recommendation interface. The screens 1000, 1010, 1020 and 1030 present various product information and comprise an advancement control (e.g. "Next" 1002). Screen 1000 provides a "personal Looks Introduction Screen" with controls 1004A and 1004B to advance to regions or items information, and overall looks information, respectively. A look selector interface 1010 of FIG. 10B presents choices (e.g. associated to selection controls 1012A, 1012B, 1012C and 1012D) for predetermined "looks" such as a "Look 1", "Look 2", "Look 3" and "Look 4" (e.g. predetermined or selected makeup product groupings having respective facial affects to achieve an overall facial affect). While labelled generically in the illustrations each look may have a descriptive or fanciful label (e.g. "dramatic", "elegant", "business", "running late", etc. Makeup types are associated for each (facial) region and are selectable (e.g. invokable) to operate the interface and request additional information presentation. The information is stored such as in database 416. In the embodiment, the looks are keyed (stored in association) with facial attribute information such as where a product or technique to apply it is associated with (e.g. recommended for) one or more particular facial attributes. For example, to achieve a particular look for a face having: an oval face, almond eyes, thick brows, brown brows, red undertone, blond hair, etc.; then applicable products for face, eyes, brows, and lips are determined.

In the embodiment, a skin type selector interface (e.g. screen 1020) presents choices (e.g. associated to selection controls 1022A, 1022B, 1022C and 1022D) for a skin type selection such as a "Type 1", "Type 2", "Type 3" and "Type 4". While labelled generically in the illustrations each type may have a descriptive or fanciful label. In the embodiment, skin type relates to normal, dry, oily, combination, etc. attribute values. In the embodiment, skin type is data provided by the user that is not automatically determined by image processing.

In the embodiment, a product recommendation is responsive to skin type. Selecting next control 1002 invokes application 402 to provide the look and skin type information for use to determine a product recommendation such as by way of message to server 412 requesting such information. In the embodiment, a message to the service provides the user's facial attribute information determined for the source image 420. In an embodiment, source image 420 is provided such as for use to apply an effect. Screen 1030 (FIG. 10D) showing source image 420 is presented (e.g. with a label "Look Match") such as when waiting to receive product recommendations. Screen 1030 provides a baseline (e.g. no makeup reference) to compare with the product recommendations as simulated in screen 100 of FIG. 11A.

In the embodiment, FIGS. 11A and 11B show a product recommendation interface (e.g. screen 1100 shown in two parts as 1100A and 1100B) in which reality is simulated. The selected look with product recommendations determined to match the facial attributes are simulated on source image 420 to present image 420D.

In the embodiment, screen 1100 presents facial attribute information (e.g. 1102) used to match products to achieve the desired (selected) look (e.g. 1102). In the embodiment, the information at 1002 indicates the look is ideal for two of the user's respective attributes (e.g. user detail 1 and user detail 2). In the embodiment, general information (e.g. 1104) for the specific look is provided. The general information, in the embodiment, includes the look's name and features and includes the look's products and tutorial information. A share/save control 1106 is provided to save or share the simulated image 420D.

In the embodiment, screen 1100 is divided to present recommendation information for each of the regions of the face (e.g. overall face, eyes, brows and lips) in respective portions 1110, 1112, 1114 and 1116. It is noted that portion 1112 for the eyes is only partially represented for brevity but is similarly constructed as the other portions 1110, 1114 and 1116. Portions 1110, 1114 and 1116 show specific product recommendations (e.g. comprising product image, colour, name, price at 1110A, 1114A and 1116A) and specific product tutorials at 1110B, 1114B and 1116B. In the embodiment, each respective product is associated with a respective purchase control (e.g. "add to cart" at 1110C, 1114C and 1116C) to add the product as an item to a shopping cart. Responsive to the amount of information to present, as an example, any of the portions 1110, 1112, 1114 and 1116 are scrollable (e.g. via swipe gesture left or right) such as to present more than one product, tutorial and purchase control for the region. A step count and/or button indicia (e.g. 1110D, 1114D and 1116D) is useful to indicate a position within such information that is currently presented on screen 1100.

In the embodiment, control 1118 adds all the products to the shopping cart. Responsive to product attributes, for example, individual products have selectable features (e.g. to choose a size, or any other selectable attribute). Selecting an associated control (not shown) for a respective product in any of the portions 1110, 1112, 114 and 1116 causes the interface to present a product selector interface 1120. For example, selecting an associated control to product recommendation 1110A in portion 1110 invokes an applicable product selector interface similar to 1120 for that product recommendation where a product detail selector 1122 replaces the recommendation 1110A and a select control 1124 to confirm a selection using detail selector 1122 replaces add to cart control 1110C.

Controls 1126 (e.g. "Choose My Look") are operable to move between various looks or within a look such as for different look features or contexts. In the embodiment a context relates to a time of day, an event, a location, etc. Invoking controls 1126 respectively results in new product recommendations and new reality simulations of associated facial effects. A search control (1128) (e.g. "Search Make-Up Family") shows additional products (interface not shown).

In the embodiment, screen 1110 presents various navigation controls 1130A, 1130B for the recommendation interface such as to change a look/change my choice (e.g. to go back one stage in navigating the look interface) restart from a beginning (e.g. to start a new image capture at screen 700), to return back to results (e.g. screen 800), quit (closing interface not shown), etc.

In an embodiment, for privacy related concerns, a server such as 412 or 414 does not persistently store the source image or any derived image such as after processing the source image. In the embodiment, Application 404 transmits the source image (in association) with requests for facial attribute processing and product simulation.

The facial attributes, as determined, are useful for a number of purposes in an e-commerce service to assist with the user experience and define the operation of an applicable user interface. For example, an application and its interface is configurable to perform any one or more of: 1. Use the skin detection to add tips to a Virtual Try-on if a user is looking at the wrong shade of foundations; 2. Use the hair color detection to recommend achievable colors; 3. Use the hair color detection to extract hair colors from trending images to recommend related colors; 4. Using more eye parameters to do a "perfect eye look"; 5. Find similar looks that fit a user based on shared traits; 6. Use the facial/hair features to predict lifestyle, personal fashion preference or other user characteristics; 7. After user deciding on a look, provide routine/actions to achieve based on their facial/hair features; and 8. Compute an evaluation of attractiveness.

Figure 12:
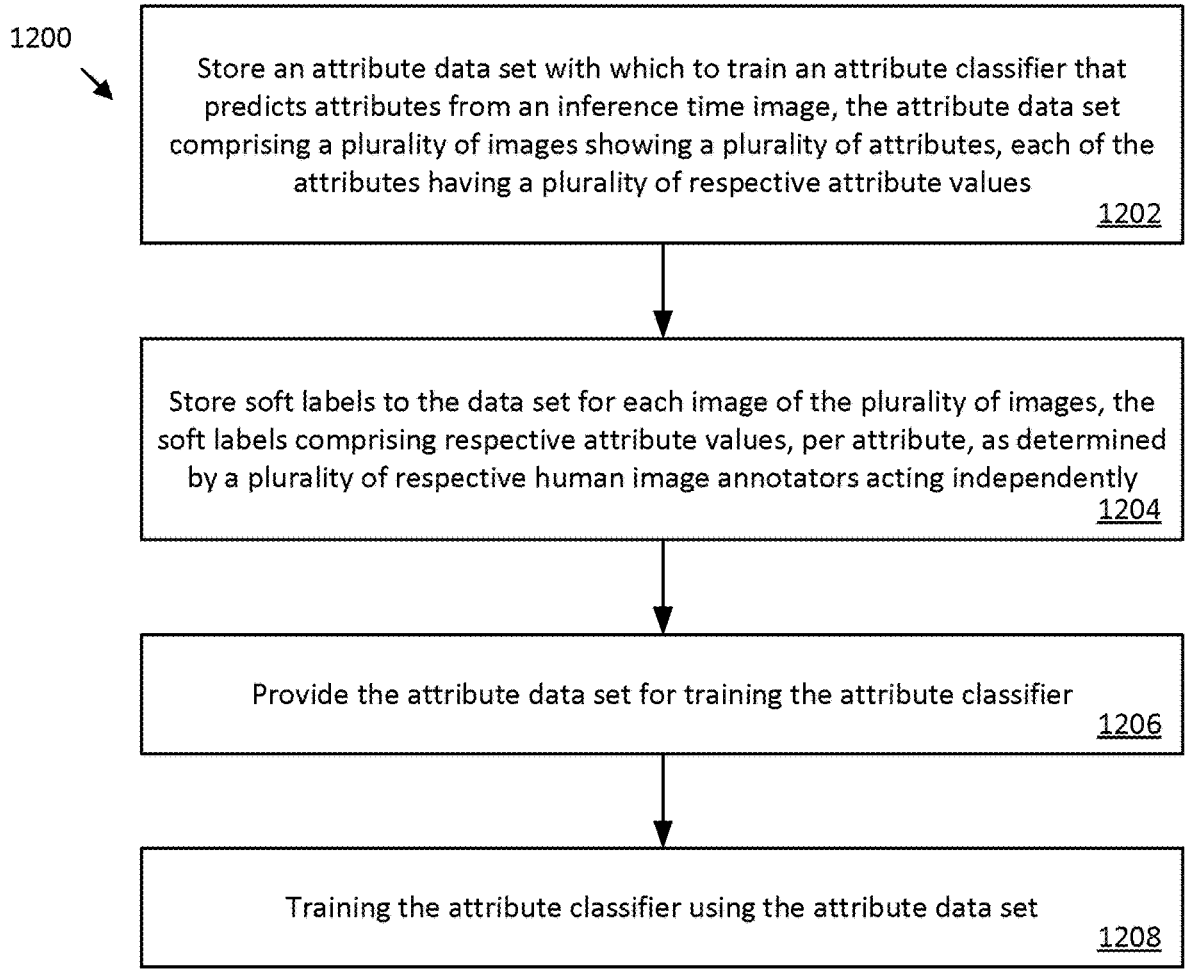
FIGS. 12, 13, 14, 15 and 16 are flowcharts of respective operations in accordance with embodiments herein.

FIG. 12 is a flow chart showing operations 1200, in accordance with an embodiment. Operations 1200 provide a method, for example, related to training and to training data sets in accordance with an embodiment described herein. At step 1202, operations store an attribute data set with which to train an attribute classifier that predicts attributes from an inference time image, the attribute data set comprising a plurality of images showing a plurality of attributes, each of the attributes having a plurality of respective attribute values. At step 1204, operations store soft labels to the data set for each image of the plurality of images, the soft labels comprising respective attribute values, per attribute, as determined by a plurality of respective human image annotators acting independently. At step 1206, operations provide the attribute data set for training the attribute classifier. Storing operations, in an embodiment, store to a data store such as, but not limited to, a database.

In an embodiment, operations 1200 may further comprise (e.g. at step 1208) training the attribute classifier using the attribute data set. In an embodiment, when training, the method comprises using a "truth" resolving rule to select a truth from among the soft labels.

In an embodiment, the attributes are associated to a plurality of respective attribute groups in accordance with an intrinsic relationship and heterogeneity of the attributes and wherein the attribute classifier comprises a plurality of sub-models, one for each of the attribute groups. In an embodiment, one of the respective attribute groups is a color attribute group for color-based attributes. In an embodiment, one of the respective attribute groups is a shape attribute group for shape-based attributes.

In an embodiment, the attributes are facial attributes. In an embodiment, the facial attributes comprise the attributes of Table 1.

It is understood that features of operations 1200, and any related embodiment, are provided in accordance with a computing device aspect and a computer program product aspect, when configured accordingly.

Figure 13:
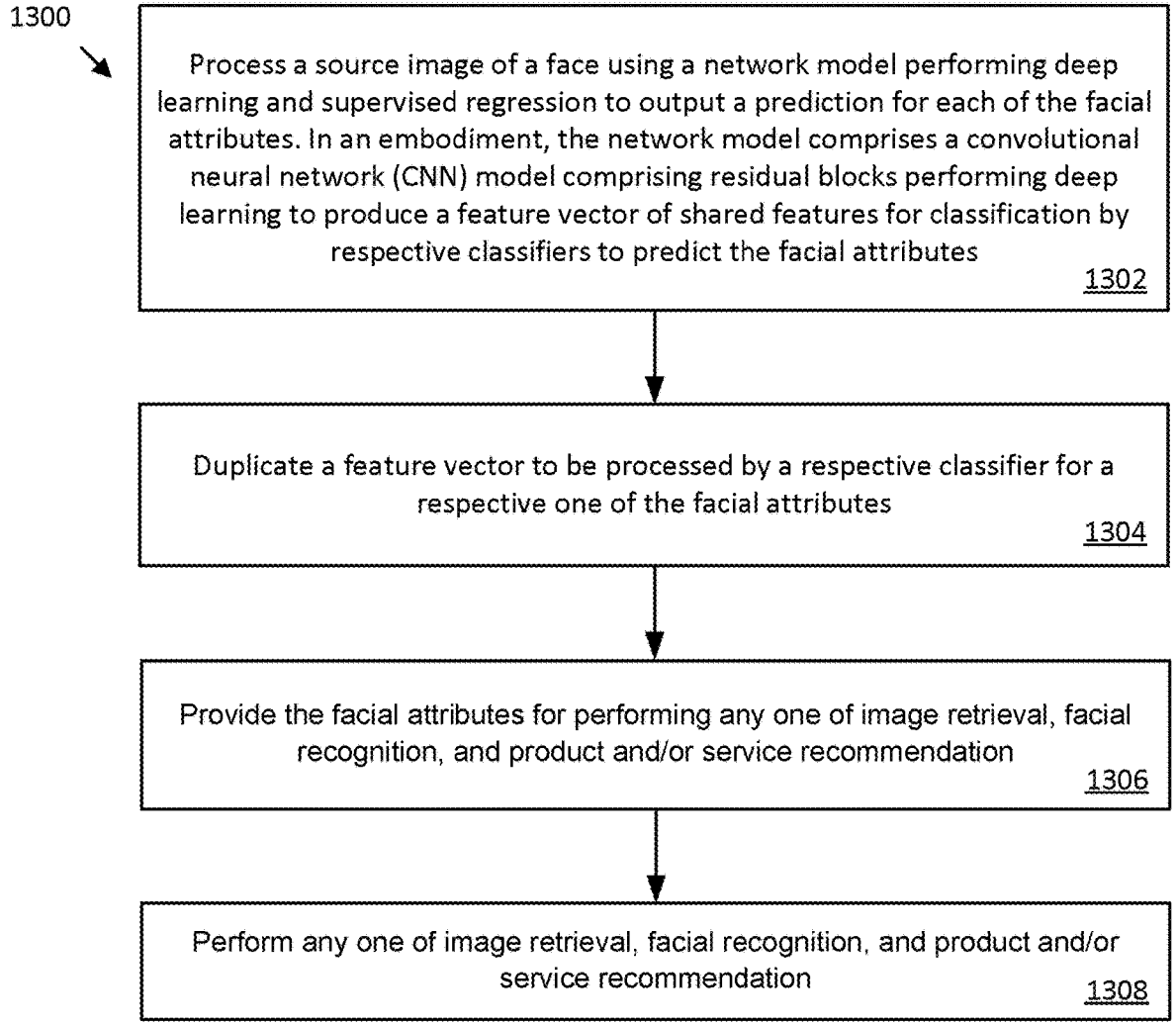

FIG. 13 is a flow chart showing operations 1300, in accordance with an embodiment. Operations 1300 provide a method, for example, to determine facial attributes. Operations 1300, at step 1302, process a source image of a face using a network model performing deep learning and supervised regression to output a prediction for each of the facial attributes. In an embodiment, the network model comprises a convolutional neural network (CNN) model comprising residual blocks performing deep learning to produce a feature vector of shared features for classification by respective classifiers to predict the facial attributes.

In an embodiment, the facial attributes are associated to a plurality of respective attribute groups in accordance with an intrinsic relationship and heterogeneity of the facial attributes and the source image is processed by a respective network model configured for a respective one of the attribute groups. In an embodiment, one of the respective attribute groups is a color attribute group for color-based facial attributes and the source image is processed by a color-based network model. In an embodiment, one of the respective attribute groups is a shape attribute group for shape-based facial attributes and the source image is processed by a shape-based network model.

In an embodiment, operations 1300, at step 1304, duplicate a feature vector to be processed by a respective classifier for a respective one of the facial attributes.

In an embodiment, the network model comprises a plurality of respective classifiers, each of the respective classifiers comprising one or more fully connected linear layers, wherein each of the respective classifiers providing as output a prediction of a respective one of the facial attributes. In an embodiment, the plurality of respective classifiers perform in parallel to provide the facial attributes.

In an embodiment, the model comprises an adapted pre-trained ResNet-based image processing network model trimmed of prediction layers.

In an embodiment, at step 1306, operations provide the facial attributes (e.g. for use by an application) for performing any one of image retrieval, facial recognition, and product and/or service recommendation.

In an embodiment, at step 1308, operations perform any one of image retrieval, facial recognition, and product and/or service recommendation.

In an embodiment, the application performs product and/or service recommendation responsive to the facial attributes and wherein the application modifies the source image to simulate an effect associated with a recommended product or service to provide a virtual try on user experience.

It is understood that features of operations 1300, and any related embodiment, are provided in accordance with a computing device aspect and a computer program product aspect, when configured accordingly.

Figure 14:
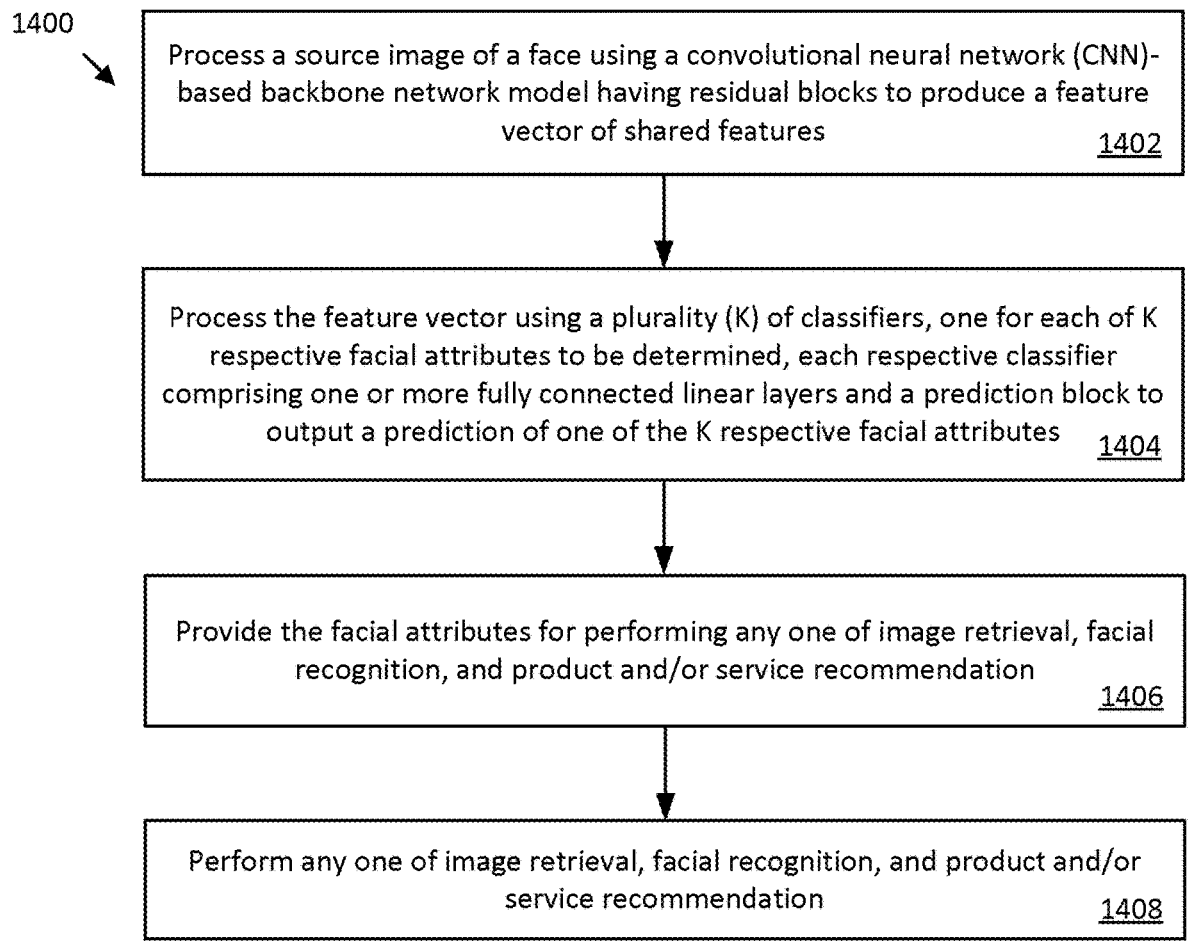

FIG. 14 is a flow chart showing operations 1400, in accordance with an embodiment. Operations 1400 provide method to determine facial attributes of a facial image. At step 1402, operations process a source image of a face using a convolutional neural network (CNN)-based backbone network model having residual blocks to produce a feature vector of shared features. At step 1402, operations process the feature vector using a plurality (K) of classifiers, one for each of K respective facial attributes to be determined, each respective classifier comprising one or more fully connected linear layers and a prediction block to output a prediction of one of the K respective facial attributes.

In accordance with an embodiment, the processing steps (1402, 1404) are performed for N source images of the face and using a prediction resolving rule to determine a final prediction of the K respective facial attributes from the N predictions of each facial attribute.

In accordance with an embodiment, the CNN-based backbone network model comprises a first network model and a second network model. In accordance with an embodiment, the first network model processes the source image for color-based facial attributes to produce a color-based feature vector for processing by respective ones of the plurality of classifiers configured to predict color-based facial attributes.

In accordance with an embodiment, wherein a second network model processes the source image for shape-based facial attributes to produce a shape-based feature vector for processing by respective ones of the plurality of classifiers configured to predict shape-based facial attributes.

In accordance with an embodiment, the feature vector is duplicated for parallel processing by the K classifiers.

In an embodiment, at step 1406, operations provide the facial attributes (e.g. for use by an application) for performing any one of image retrieval, facial recognition, and product and/or service recommendation.

In an embodiment, at step 1408, operations perform any one of image retrieval, facial recognition, and product and/or service recommendation.

In an embodiment, the application performs product and/or service recommendation responsive to the facial attributes and wherein the application modifies the source image to simulate an effect associated with a recommended product or service to provide a virtual try on user experience.

It is understood that features of operations 1400, and any related embodiment, are provided in accordance with a computing device aspect and a computer program product aspect, when configured accordingly.

Figure 15:
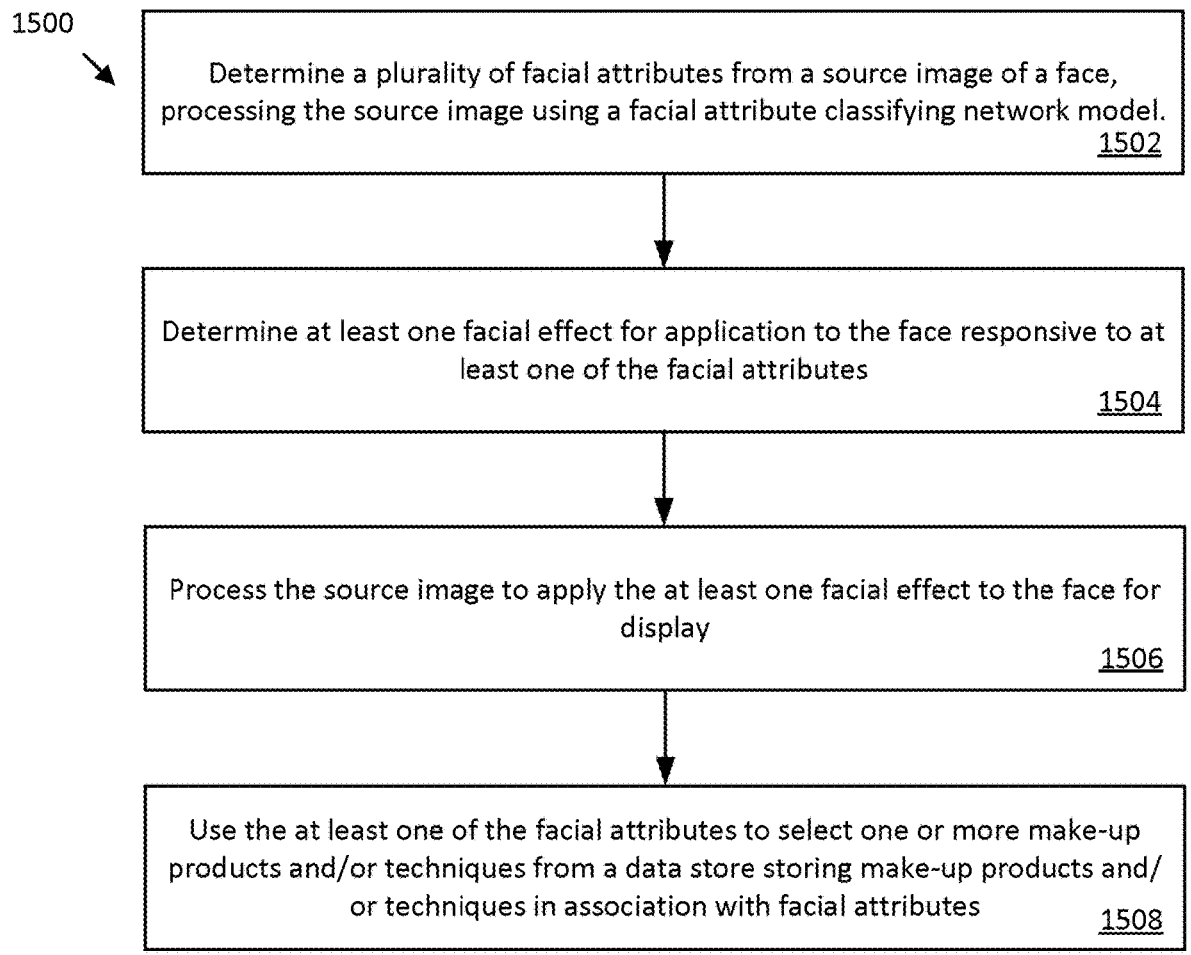

FIG. 15 is a flow chart showing operations 1500, in accordance with an embodiment. Operations 1500 provide a method to simulate a reality. Operations at 1502 determine a plurality of facial attributes from a source image of a face, processing the source image using a facial attribute classifying network model. At 1504, operations determine at least one facial effect for application to the face responsive to at least one of the facial attributes. Operations (at 1506) process the source image to apply the at least one facial effect to the face for display.

In an embodiment, the facial attributes of operations 1500 are determined using respective operations 1200 or 1300 including any related embodiment of such respective operations 1200 or 1300. Operations 1500 may thus include performing such operations 1200 or 1300 including any related embodiment.

In an embodiment, the at least one facial effect is a simulation of at least one make-up product and/or technique to be applied to the face.

In an embodiment, processing the source image to apply the at least one facial effect comprises using a deep learning network configured to apply the facial effect.

In an embodiment, operations 1500 at step 1508 use the at least one of the facial attributes to select one or more make-up products and/or techniques from a data store storing make-up products and/or techniques in association with facial attributes.

It is understood that features of operations 1500, and any related embodiment, are provided in accordance with a computing device aspect and a computer program product aspect, when configured accordingly.

Figure 16:
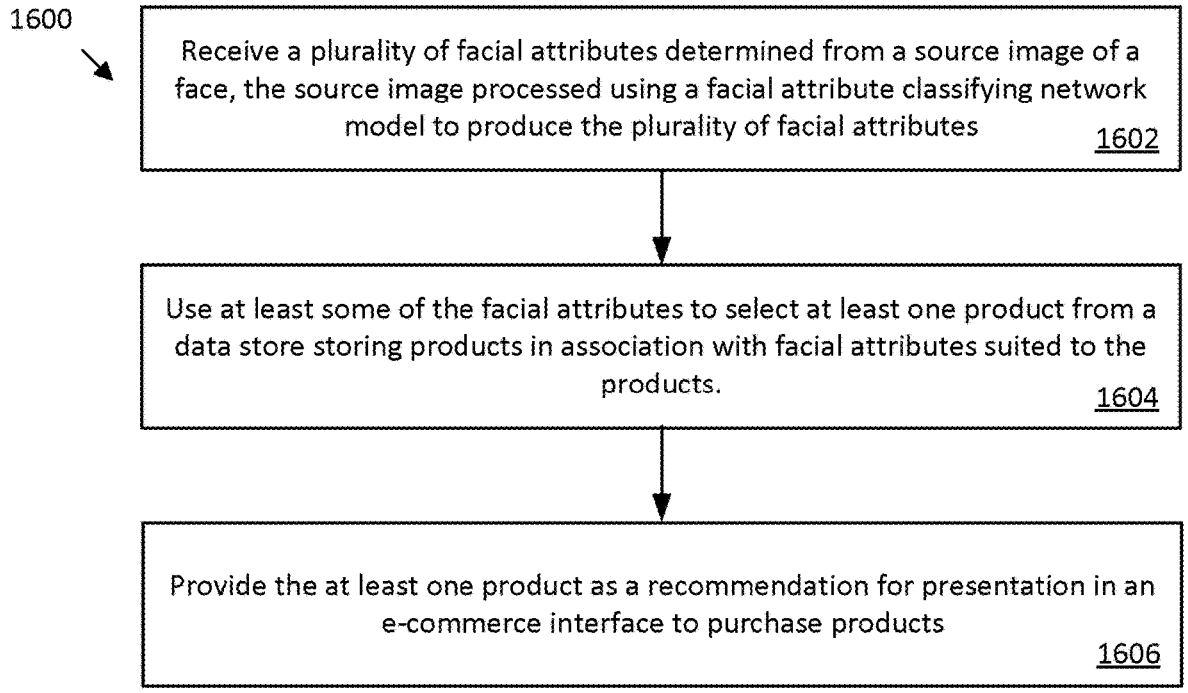

FIG. 16 is a flow chart showing operations 1600, in accordance with an embodiment. Operations 1600 provide a method to recommend products for an e-commerce service. At step 1602, operations receive a plurality of facial attributes determined from a source image of a face, the source image processed using a facial attribute classifying network model to produce the plurality of facial attributes. At 1604, operations use at least some of the facial attributes to select at least one product from a data store storing products in association with facial attributes suited to the products. At 1606 operations provide the at least one product as a recommendation for presentation in an e-commerce interface to purchase products.

In an embodiment, the facial attributes of operations 1600 are determined using respective operations 1200 or 1300 including any related embodiment of such respective operations 1200 or 1300. Operations 1600 may thus include performing such operations 1200 or 1300 including any related embodiment.

In an embodiment, the products comprise make-up products.

In an embodiment, the make-up products are variously associated in the data store to define predetermined make-up looks; operations (not shown) receive an identification of one of the predetermined make-up looks; and the step of using at least some of the facial attributes is responsive to the one of the predetermined make-up looks when selecting the at least one product. In an embodiment, each of the make-up products is associated with one of a plurality of make-up types and the method comprises selecting at least one product, responsive to the facial attributes, for each of make-up types to define the recommendation. In an embodiment, the make-up types comprise a face product type, an eye product type, a brow product type and a lip product type.

In an embodiment, operations (not shown) further recommend a technique to use the recommended products.

In an embodiment, for example, via an interface which may comprise the e-commerce interface, operations (not shown) provide a simulation of the at least one product as applied to the face by processing the source image.

In an embodiment, operations (not shown) provide an e-commerce shopping service to purchase at least some of the recommended products.

It is understood that features of operations 1600, and any related embodiment, are provided in accordance with a computing device aspect and a computer program product aspect, when configured accordingly.

The computing device(s) and interfaces shown and described herein provide a plurality of different aspects. For example, in an embodiment, a computing device is configurable such as a component of a system, the system comprising one or more specific functional units including processing circuitry configured to perform respective functions.

Figure 17:
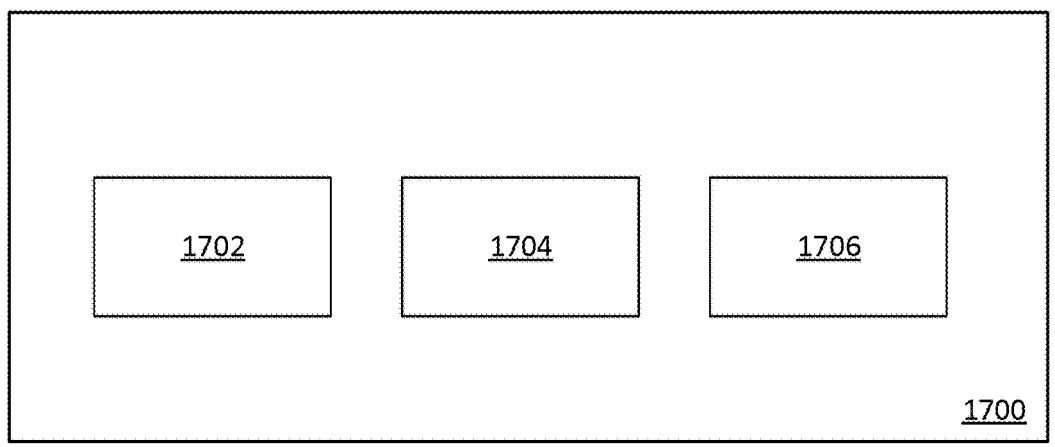
FIG. 17 is a block diagram of a system in accordance with an embodiment herein.

In one such aspect, as shown in FIG. 17, there is provided a system 1700, comprising: a facial-attribute unit 1702 including processing circuitry configured to extract a plurality of facial attributes from a source image of a face and to generate one or more facial effects based on the extract plurality of facial attributes; and a face-effect unit 1704 including processing circuitry configured to apply at least one facial effect to the source image and to generate one or more virtual instances of an applied-effect source image on an e-commerce interface.

In an embodiment, the system further comprises a user experience unit 1706 including processing circuitry configured to determine at least one product from a data store storing products in association with one or more of the plurality of facial attributes and to generate one or more virtual instances of a product recommendation on an e-commerce interface to purchase products.

In an embodiment, the facial-attribute unit includes processing circuitry configured to execute a network model performing deep learning and supervised regression to output a prediction for each of the plurality of facial attributes from the source image of a face.

In an embodiment, the face-effect unit includes processing circuitry configured to generate a virtual representation including at least a portion of the applied-effect source image and at least one of a make-up product or a make-up application technique.

In an embodiment, the face-effect comprises an annotation responsive to a one of the facial attributes. In an embodiment, the annotation comprises a facial attribute value for the facial attribute and/or the annotation is located (e.g. positioned on the source image (e.g. as an overlay)) at a region of the source image from which the facial attribute is determined.

In an embodiment, the facial attributes determine by facial attribute unit 1702 are determined using respective operations 1200 or 1300 including any related embodiment of such respective operations 1200 or 1300. Facial attribute unit may thus be configured to performing such operations 1200 or 1300 including any related embodiment.

In other embodiments, other practical applications use the facial attribute classifier as described herein. Other embodiments include image retrieval, face recognition, etc. A main task for image retrieval is to retrieve an image from a vastly large database (in size this large, searching sequentially will normally not work). In an embodiment, face attributes are computed for images stored to an image database and keyed accordingly. A candidate image for searching also has attributes computed and these are used to narrow search criteria or to define confidence match data or to order search results, (e.g. the candidate image matches 5 of 7 facial attributes of a one particular stored image and 6 of 7 of a second particular stored image, the result of which is used to order search results or choose one among (partially) matching stored images), etc.

For example, CNN models like ResNet can represent the images as "features", which are a compressed representation of the original image and thus usually much smaller and easier to search.

In face recognition such a task mainly concerns finding, classifying or grouping different images of the same identity (person). Similar techniques are performable using facial attributes.

The present disclosure describes the collection of a comprehensive dataset that enables a method to predict a special set of (facial) attributes that were not previously covered in any previous works or datasets. While previous works (e.g. on the "CelebFaces Attributes Dataset" (CelebA) dataset (a face attribute dataset from the Multimedia Laboratory of the Chinese University of Hong Kong available at URL: mmlab.ie.cuhk.edu.hIc/projects/CelebA.html) previously explored convolutional neural networks (CNNs), such did not set different branches for each attribute. That is, separate classifier heads for each different attribute were not used. Different sub-models were not used for different attributes having inherent relationships such as color and shape.

In the embodiment of the collection of the dataset as shown and described herein, the training workflow used a soft-label to improve the model accuracy. The attribution classifiers resulting from the training are on par with human annotation.

Practical implementation may include any or all of the features described herein. These and other aspects, features and various combinations may be expressed as methods, apparatus, systems, means for performing functions, program products, and in other ways, combining the features described herein. A number of embodiments have been described. Nevertheless, it will be understood that various modifications can be made without departing from the spirit and scope of the processes and techniques described herein. In addition, other steps can be provided, or steps can be eliminated, from the described process, and other components can be added to, or removed from, the described systems. Accordingly, other embodiments are within the scope of the following claims.

Throughout the description and claims of this specification, the word "comprise" and "contain" and variations of them mean "including but not limited to" and they are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise.

Features, integers, characteristics, or groups described in conjunction with a particular aspect, embodiment or example of the invention are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples or embodiments. The invention extends to any novel one, or any novel combination, of the features disclosed in this specification (including any accompanying claims, abstract and drawings) or to any novel one, or any novel combination, of the steps of any method or process disclosed.

REFERENCES

1. Deep Residual Learning for Image Recognition", He, Kaiming et. al, 2015 Dec. 10, available at URL arxiv.org/abs/1512.03385.
2. A Survey of Deep Facial Attribute Analysis, Xin Zheng, Xin et. al, Submitted on 26 Dec. 2018 (v1), last revised 27 Oct. 2019 (this version, v3) URL arxiv.org/abs/1812.10265.
3. Deep Learning Face Attributes in the Wild, Liu, Ziwei et. al, Submitted on 28 Nov. 2014 (v1), last revised 24 Sep. 2015 (this version, v3), URL: arxiv.org/abs/1411.7766.

What is claimed is:

1. A method to determine facial attributes, the method comprising:
   processing a source image of a face using a network model performing deep learning and supervised regression to output a prediction for each of the facial attributes;
   wherein the network model comprises a convolutional neural network (CNN) model comprising residual blocks performing deep learning to produce a feature vector of shared features for classification by respective classifiers to predict the facial attributes;
   wherein the facial attributes are associated to a plurality of respective attribute groups in accordance with an intrinsic relationship and heterogeneity of the facial attributes, the plurality of attribute groups comprising a shape-related attribute group and a color-related attribute group;
   duplicating the feature vector to be processed by a respective classifier for a respective one of the facial attributes;
   wherein the network model comprises a plurality of respective classifiers to process the feature vector as duplicated, each of the respective classifiers comprising one or more fully connected linear layers, and without a convolutional layer, wherein each of the respective classifiers providing as output a prediction of a respective one of the facial attributes; and
   wherein the network model comprises a combination of a first network sub model trained to identify shape-related attributes and a second network sub model trained to identify color-related attributes.

2. The method of claim 1 comprising providing the facial attributes for use by an application performing any one of image retrieval, facial recognition, and product and/or service recommendation.

3. The method of claim 2, wherein the application performs product and/or service recommendation responsive to the facial attributes and wherein the application modifies the source image to simulate an effect associated with a recommended product or service to provide a virtual try on user experience.

4. The method of claim 1, wherein at least some of the respective classifiers are associated to the shape-related attribute group and defined having a first structure comprising two fully connected linear layers and a prediction block and at least some of the respective classifiers are associated to the color-related attribute group and defined having a second structure comprising a single fully connected linear layer and a prediction block.

5. The method of claim 1, wherein the plurality of respective classifiers perform in parallel to provide the facial attributes.

6. A method to determine facial attributes, the method comprising:
   processing a source image of a face using a network model performing deep learning and supervised regression to output a prediction for each of the facial attributes;
   wherein the network model comprises a convolutional neural network (CNN) model comprising residual blocks performing deep learning to produce a feature vector of shared features for classification by respective classifiers to predict the facial attributes; and
   wherein the model comprises an adapted pre-trained ResNet-based image processing network model trimmed of prediction layers.

7. The method of claim 6 comprising processing the source image using the facial attribute classifying network model to produce the plurality of facial attributes.

8. A method to determine facial attributes of a facial image, the method comprising:
   processing a source image of a face using a convolutional neural network (CNN)-based backbone network model having residual blocks to produce a feature vector of shared features; and
   processing the feature vector using a plurality (K) of classifiers, one for each of K respective facial attributes to be determined, each respective classifier comprising one or more fully connected linear layers and a prediction block, and without one or more convolutional layers, to process an instance of the feature vector to output a prediction of one of the K respective facial attributes;
   wherein the facial attributes are associated to a plurality of respective attribute groups in accordance with an intrinsic relationship and heterogeneity of the facial attributes, the plurality of attribute groups comprising a shape-related attribute group and a color-related attribute group; and
   wherein the network model comprises a combination of a first network sub model trained to identify shape-related attributes and a second network sub model trained to identify color-related attributes.

9. The method of claim 8, wherein the first network sub model processes the source image for color-based facial attributes to produce a color-based feature vector for processing by respective ones of the plurality of classifiers configured to predict color-based facial attributes.

10. The method of claim 8, wherein the second network sub model processes the source image for shape-based facial attributes to produce a shape-based feature vector for processing by respective ones of the plurality of classifiers configured to predict shape-based facial attributes.

11. The method of claim 8, comprising duplicating the feature vector for parallel processing by the K classifiers.

12. The method of claim 8 further comprising presenting an augmented and/or virtual reality comprising:
    determining at least one facial effect for application to the face responsive to at least one of the facial attributes; and
    processing the source image to apply the at least one facial effect to the face for display.

13. The method of claim 12, wherein the at least one facial effect comprises a simulation of at least one make-up product and/or technique to be applied to the face.

14. The method of claim 12, wherein processing the source image to apply the at least one facial effect comprises using a deep learning network configured to apply the facial effect.

15. The method of claim 12 comprising using the at least one of the facial attributes to select one or more make-up products and/or techniques from a data store storing make-up products and/or techniques in association with facial attributes.

16. A method to determine facial attributes of a facial image, the method comprising:
    processing a source image of a face using a convolutional neural network (CNN)-based backbone network model having residual blocks to produce a feature vector of shared features;
    processing the feature vector using a plurality (K) of classifiers, one for each of K respective facial attributes to be determined, each respective classifier comprising one or more fully connected linear layers and a prediction block, and without one or more convolutional layers, to process an instance of the feature vector to output a prediction of one of the K respective facial attributes; and
    performing the processing steps for N source images of the face and using a prediction resolving rule to determine a final prediction of the K respective facial attributes from the N predictions of each facial attribute.

* * * * *